United States Patent
Jha et al.

(10) Patent No.: US 12,461,669 B2
(45) Date of Patent: Nov. 4, 2025

(54) MEMORY DEVICE BACKGROUND OPERATION MANAGEMENT FOR LOW HOST BATTERY

(71) Applicant: QUALCOMM Incorporated, San Diego, CA (US)

(72) Inventors: Pratibind Kumar Jha, Hyderabad (IN); Manish Garg, Hyderabad (IN); Ashwini Pandey, Muzaffarpur (IN); Abhishek Ghosh, Kolkata (IN)

(73) Assignee: Qualcomm Incorporated, San Diego, CA (US)

( * ) Notice: Subject to any disclaimer, the term of this patent is extended or adjusted under 35 U.S.C. 154(b) by 29 days.

(21) Appl. No.: 18/584,516

(22) Filed: Feb. 22, 2024

(65) Prior Publication Data
US 2025/0272010 A1    Aug. 28, 2025

(51) Int. Cl.
*G06F 3/06* (2006.01)

(52) U.S. Cl.
CPC .......... *G06F 3/0625* (2013.01); *G06F 3/0634* (2013.01); *G06F 3/0673* (2013.01)

(58) Field of Classification Search
CPC .... G06F 3/0611; G06F 3/0673; G06F 3/0625; G06F 3/0634
See application file for complete search history.

(56) References Cited

U.S. PATENT DOCUMENTS

| | | | | |
|---|---|---|---|---|
| 6,219,294 | B1 * | 4/2001 | Huber | G11C 5/143 365/205 |
| 2011/0026328 | A1 * | 2/2011 | Moshayedi | G11C 16/10 365/189.05 |
| 2014/0051379 | A1 * | 2/2014 | Ganesh | H04W 4/90 455/404.1 |
| 2021/0200700 | A1 * | 7/2021 | Tanpairoj | G06F 3/061 |
| 2023/0236652 | A1 * | 7/2023 | Moshe | G06F 1/3203 713/320 |
| 2024/0340343 | A1 * | 10/2024 | Zhu | H04L 67/1097 |

FOREIGN PATENT DOCUMENTS

JP    4773693 B2 *  9/2011

OTHER PUBLICATIONS

JP-4773693-B2 Translation (Year: 2011).*

* cited by examiner

*Primary Examiner* — Zhuo H Li
(74) *Attorney, Agent, or Firm* — Harrity & Harrity, LLP

(57) ABSTRACT

In some aspects, a memory system may detect that a host device of the memory system has a low battery status using a comparison of a battery level of the host device to a low battery threshold. The memory system may set, in association with detecting that the host device has the low battery status, a low battery status indication of a status register for a memory device of the memory system to indicate that the host device has the low battery status. The memory system may cause, in association with the status register indicating the low battery status indication, one or more background operations of the memory device to be deferred or unexecuted. Numerous other aspects are described.

20 Claims, 11 Drawing Sheets

MEMORY DEVICE BACKGROUND OPERATION MANAGEMENT FOR LOW HOST BATTERY

FIELD OF THE DISCLOSURE

Aspects of the present disclosure generally relate to integrated circuits, memory devices, and, for example, to memory device background operation management for low host battery.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

Flash memory is a non-volatile data storage medium in which data may be electrically written and erased. Flash memory is currently used in a variety of flash memory based storage devices, such as memory cards, solid state drives, and/or universal serial bus (USB) drives, among other examples. Flash memory based storage devices may provide faster read and write times comparable to DRAM while providing higher durability and impact resistance than conventional hard disks.

To facilitate the use of flash memory based storage devices, standards are being developed or are currently under development. One example standard is universal flash storage (UFS) developed by the Joint Electronic Devices Engineering Council (JEDEC) for flash memory based storage. UFS employs command protocols and a small computer system interface (SCSI) architecture model that supports multiple commands with command queue features, thereby enabling a multi-threaded programming paradigm. Another standard developed by JEDEC is the Embedded Multimedia Card (eMMC) standard, which provides a simplified application interface design, small package size, and/or low power consumption, among other examples.

SUMMARY

Some implementations described herein relate to a host device. The host device may include one or more memories and one or more processors coupled to the one or more memories. The one or more processors may be configured to detect that the host device has a low battery status using a comparison of a battery level of the host device to a low battery threshold. The one or more processors may be configured to provide, in association with detecting that the host device has the low battery status, a low battery status indication to a memory device via a status register to cause one or more background operations of the memory device to be deferred or unexecuted while the status register indicates the low battery status indication.

Some implementations described herein relate to a memory device. The memory device may include one or more memories and one or more processors coupled to the one or more memories. The one or more processors may be configured to obtain, via a status register, a low battery status indication for a host device that indicates that the host device has a low battery level. The one or more processors may be configured to perform, in association with obtaining the low battery status indication, an action to defer or delay one or more background operations while the status register indicates the low battery status indication.

Some implementations described herein relate to a memory system. The memory system may include one or more memories and one or more processors coupled to the one or more memories. The one or more processors may be configured to detect that a host device of the memory system has a low battery status using a comparison of a battery level of the host device to a low battery threshold. The one or more processors may be configured to set, in association with detecting that the host device has the low battery status, a low battery status indication of a status register for a memory device of the memory system to indicate that the host device has the low battery status. The one or more processors may be configured to cause, in association with the status register indicating the low battery status indication, one or more background operations of the memory device to be deferred or unexecuted.

Some implementations described herein relate to a method performed by a host device. The method may include detecting that the host device has a low battery status using a comparison of a battery level of the host device to a low battery threshold. The method may include providing, in association with detecting that the host device has the low battery status, a low battery status indication to a memory device via a status register to cause one or more background operations of the memory device to be deferred or unexecuted while the status register indicates the low battery status indication.

Some implementations described herein relate to a method performed by a memory device. The method may include obtaining, via a status register, a low battery status indication for a host device that indicates that the host device has a low battery level. The method may include performing, in association with obtaining the low battery status indication, an action to defer or delay one or more background operations while the status register indicates the low battery status indication.

Some implementations described herein relate to a method performed by a memory system. The method may include detecting that a host device of the memory system has a low battery status using a comparison of a battery level of the host device to a low battery threshold. The method may include setting, in association with detecting that the host device has the low battery status, a low battery status indication of a status register for a memory device of the memory system to indicate that the host device has the low battery status. The method may include causing, in association with the status register indicating the low battery status indication, one or more background operations of the memory device to be deferred or unexecuted.

Some implementations described herein relate to a non-transitory computer-readable medium that stores a set of instructions. The set of instructions, when executed by one or more processors of a host device, may cause the host device to detect that the host device has a low battery status using a comparison of a battery level of the host device to a low battery threshold. The set of instructions, when executed by one or more processors of the host device, may cause the host device to provide, in association with detecting that the host device has the low battery status, a low battery status indication to a memory device via a status register to cause one or more background operations of the memory device to be deferred or unexecuted while the status register indicates the low battery status indication.

Some implementations described herein relate to a non-transitory computer-readable medium that stores a set of instructions. The set of instructions, when executed by one or more processors of a memory device, may cause the memory device to obtain, via a status register, a low battery status indication for a host device that indicates that the host device has a low battery level. The set of instructions, when executed by one or more processors of the memory device, may cause the memory device to perform, in association with obtaining the low battery status indication, an action to defer or delay one or more background operations while the status register indicates the low battery status indication.

Some implementations described herein relate to a non-transitory computer-readable medium that stores a set of instructions. The set of instructions, when executed by one or more processors of a memory system, may cause the memory system to detect that a host device of the memory system has a low battery status using a comparison of a battery level of the host device to a low battery threshold. The set of instructions, when executed by one or more processors of the memory system, may cause the memory system to set, in association with detecting that the host device has the low battery status, a low battery status indication of a status register for a memory device of the memory system to indicate that the host device has the low battery status. The set of instructions, when executed by one or more processors of the memory system, may cause the memory system to cause, in association with the status register indicating the low battery status indication, one or more background operations of the memory device to be deferred or unexecuted.

Some implementations described herein relate to an apparatus. The apparatus may include means for detecting that the host device has a low battery status using a comparison of a battery level of the host device to a low battery threshold. The apparatus may include means for providing, in association with detecting that the host device has the low battery status, a low battery status indication to a memory device via a status register to cause one or more background operations of the memory device to be deferred or unexecuted while the status register indicates the low battery status indication.

Some implementations described herein relate to an apparatus. The apparatus may include means for obtaining, via a status register, a low battery status indication for a host device that indicates that the host device has a low battery level. The apparatus may include means for performing, in association with obtaining the low battery status indication, an action to defer or delay one or more background operations while the status register indicates the low battery status indication.

Some implementations described herein relate to an apparatus. The apparatus may include means for detecting that a host device of the memory system has a low battery status using a comparison of a battery level of the host device to a low battery threshold. The apparatus may include means for setting, in association with detecting that the host device has the low battery status, a low battery status indication of a status register for a memory device of the memory system to indicate that the host device has the low battery status. The apparatus may include means for causing, in association with the status register indicating the low battery status indication, one or more background operations of the memory device to be deferred or unexecuted.

Aspects generally include a method, apparatus, system, computer program product, non-transitory computer-readable medium, user device, user equipment, electronic device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
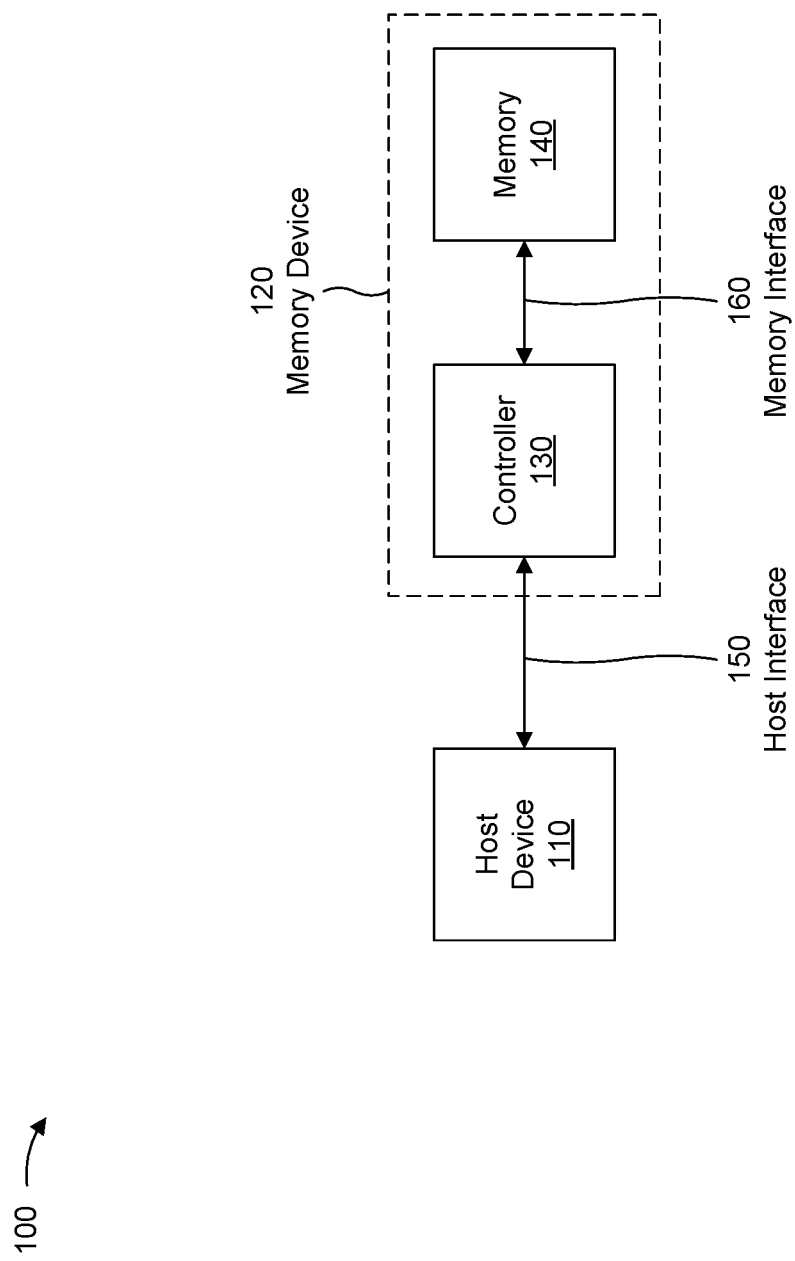
FIG. 1 is a diagram illustrating an example system that may support memory device background operation management for low host battery, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some examples, a memory device (e.g., a non-volatile memory device or a flash device, such as a universal flash storage (UFS) device) may perform one or more background operations. As used herein, a "background" operation may refer to an operation performed by the memory device associated with the management, optimization, and/or integrity of data stored by the memory device. In some examples, a background operation may be an operation performed by the memory device for data stored by the memory device (e.g., to manage the data stored by the memory device). For example, a background operation may be different than an operation to access memory resources of the memory device, such as a read operation or a write operation. As an example, a background operation may include a refresh operation, a garbage collection operation, a wear leveling operation, a purge operation, an error correction operation, and/or a read disturb management operation, among other examples.

The memory device may use power management operations to reduce power consumption of the memory device. For example, a power mode of the memory device may define different operational states of the memory device that have different power consumptions for different scenarios. As an example, the power mode may include an active power mode, a pre-active power mode, an idle power mode, a sleep power mode, a pre-sleep power mode, a power down power mode, and/or a pre-power down power mode, among other examples. The power mode may be set or configured by a host device. For example, the host device may transmit, and the memory device may receive, an indication of the power mode in which the memory device is to operate. As an example, the host device may transmit, and the memory device may receive, an indication that the memory device is to operate in a power mode associated with relatively low power consumption (e.g., the idle power mode or the sleep power mode) to conserve power resources (e.g., of a battery of the host device).

However, in some cases, the memory device may perform one or more background operations while being configured (e.g., by the host device) to operate in the power mode associated with relatively low power consumption (e.g., the idle power mode or the sleep power mode). If background operation(s) continue on the memory device, the memory device may transition to an active power mode (e.g., a power mode associated with relatively high power consumption). The background operation(s) may occur periodically and/or may be in an automated manner (e.g., without explicit instructions from the host device) as managed by the memory device. For example, if background operations are continuing, then the memory device may be considered to be in the active power mode. As a result, background operations of the memory device may reduce an efficiency of the power saving of the power mode(s) associated with relatively low power consumption (e.g., the idle power mode or the sleep power mode). For example, performing the background operation(s) may cause the memory device to consume power resources when the memory device is otherwise to be operating in a power mode designed to reduce power consumption. The additional power consumption may negatively impact performance of the memory device and/or the host device, such as by consuming a power resource of the host device when the host device has relatively low power (e.g., resulting in the host device performing additional operations to reduce power consumption).

Various aspects relate generally to memory device background operation management for low host battery. In some aspects, a low battery status indication may be configured for a memory device to enable a host device to indicate to the memory device when the host device has a low battery status. The configuring or setting of the low battery status indication may enable the memory device to perform (or refrain from performing) one or more actions associated with background operations to conserve power.

For example, in some aspects, the memory device may refrain from performing one or more (or any) background operations while the low battery status indication is set or configured (e.g., in a status register). For example, before initiating a background operation, the memory device may determine whether the low battery status indication is set or configured. If the low battery status indication is set or configured, then the memory device may defer and/or refrain from performing the background operation. In such examples, the memory device may store an indication of the background operation(s) that would have otherwise been performed (e.g., if the low battery status indication was not set or configured) in a pending job queue. After the low battery status indication is removed or de-configured, the memory device may perform the background operation(s) indicated in the pending job queue.

As another example, if the low battery status indication is set or configured, the memory device may switch a mode of one or more background operations to a mode in which the one or more background operations are managed or controlled by the host device. As an example, if the low battery status indication is set or configured and a refresh operation is in a selective mode (e.g., in which the memory device may selectively perform the refresh operation), then the memory device and/or the host device may switch the mode of the refresh operation to a manual or forced mode (e.g., in which the host device controls when the refresh operation is performed).

In some aspects, if the low battery status indication is set or configured, the memory device may disable an exception event control indication for urgent background operations (e.g., an urgent_bkops bit). For example, before initiating a background operation, the memory device may determine whether the low battery status indication is set or configured. If the low battery status indication is set or configured, then the memory device may disable background operations that include an exception event control indication (e.g., a WExceptionEventControl bit).

Particular aspects of the subject matter described in this disclosure can be implemented to realize one or more of the following potential advantages. In some examples, by setting or configuring the low battery status indication, the memory device may perform improved management of background operations when the host device has a low battery status. The improved management of the background operations may improve the efficiency of power saving operation(s), thereby conserving power resources of the memory device and/or of the host device. In some aspects, by storing the indication of the background operation(s) that would have otherwise been performed (e.g., if the low battery status indication was not set or configured) in a pending job queue, the memory device may be enabled to perform the background operations that were deferred after the battery condition of the host device improves (e.g., after the host device no longer has the low battery status). In some aspects, by switching the mode of one or more background operations to a mode in which the one or more background operations are managed or controlled by the host device, a likelihood that a background operation is performed while the memory device is in a power mode associated with relatively low power consumption (e.g., the idle power mode or the sleep power mode) may be reduced because the host device is now managing or controlling when the background operation will be performed. This may improve the power saving efficiency of the power mode.

FIG. 1 is a diagram illustrating an example system 100 that may support memory device background operation management for low host battery, in accordance with the present disclosure. The system 100 may include one or more devices, apparatuses, and/or components for performing operations described herein. The system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160. In some examples, the system 100 may be referred to as a memory system and the memory device 120 may be referred to as a memory sub-system.

The system 100 may be any suitable electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device, among other examples. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), or the like.

The memory device 120 may be any electronic device configured to store data in memory. In some aspects, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some aspects, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device 110 (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some aspects, the controller 130 may be a high-level controller, which may communicate directly with the host device 110 and may instruct one or more low-level controllers regarding memory operations to be performed in connection with the memory 140. In some examples, the controller 130 may be a low-level controller, which may receive instructions regarding memory operations from a high-level controller that interfaces directly with the host device 110. As an example, a high-level controller may be a solid state drive (SSD) controller, and a low-level controller may be a non-volatile memory controller (e.g., a NAND controller) or a volatile memory controller (e.g., a DRAM controller). In some aspects, a set of operations described herein as being performed by the controller 130 may be performed by a single controller (e.g., the entire set of operations may be performed by a single high-level or low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a small computer system interface (SCSI), a serial-attached SCSI (SAS), a serial advanced technology attachment (SATA) interface, a peripheral component interconnect express (PCIe) interface, a non-volatile memory express (NVMe) interface, a universal serial bus (USB) interface, a UFS interface, and/or an embedded multimedia card (eMMC) interface, among other examples.

The memory interface 160 enables communication between the controller 130 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some aspects, as described in more detail elsewhere herein, one or more systems, devices, apparatuses, components, and/or controllers of FIG. 1 may be configured to detect that the host device 110 has a low battery status using a comparison of a battery level of the host device 110 to a low battery threshold; and/or provide, in association with detecting that the host device 110 has the low battery status, a low battery status indication to a memory device 120 via a status register to cause one or more background operations of the memory device 120 to be deferred or unexecuted while the status register indicates the low battery status indication. Additionally, or alternatively, one or more systems, devices, apparatuses, components, and/or controllers of FIG. 1 may be configured to obtain, via a status register, a low battery status indication for a host device 110 that indicates that the host device 110 has a low battery level; and/or perform, in association with obtaining the low battery status indication, an action to defer or delay one or more background operations while the status register indicates the low battery status indication. Additionally, or alternatively, one or more systems, devices, apparatuses, components, and/or controllers of FIG. 1 may be configured to detect that a host device 110 has a low battery status using a comparison of a battery level of the host device to a low battery threshold; set, in association with detecting that the host device has the low battery status, a low battery status indication of a status register for a memory device 120 to indicate that the host device has the low battery status; and/or cause, in association with the status register indicating the low battery status indication, one or more background operations of the memory device 120 to be deferred or unexecuted. Additionally, or alternatively, one or more systems, devices, apparatuses, components, and/or controllers of FIG. 1 may be configured to perform one or more other operations described herein.

As indicated above, FIG. 1 is provided as an example. Other examples may differ from what is described with regard to FIG. 1. For example, some aspects described herein are broadly applicable to other circuits, including circuits that are fully contained on-die (e.g., within a system-on-chip (SoC)) and/or circuits associated with non-memory external interfaces (e.g., a serializer/deserializer (SerDes)).

Figure 2:
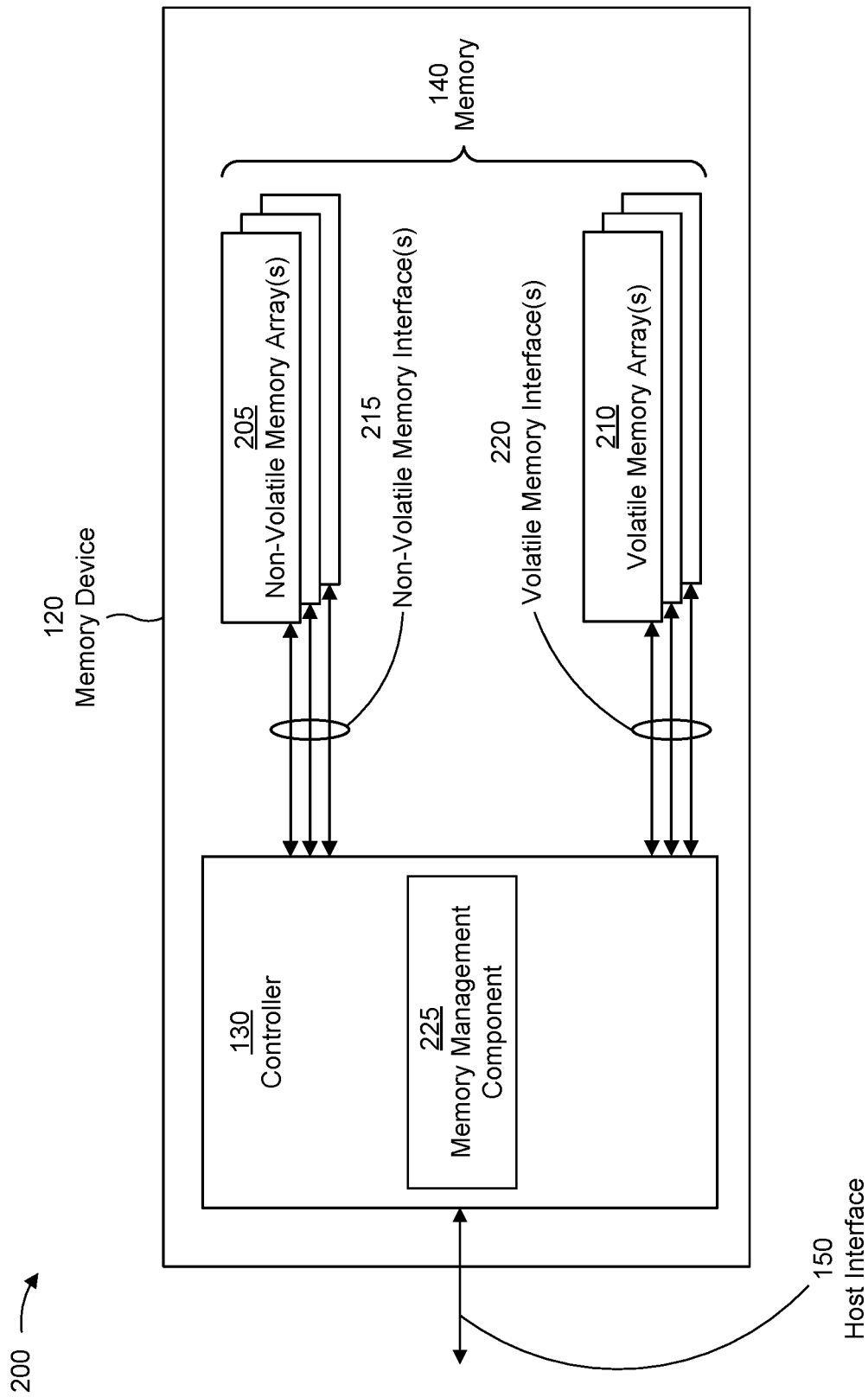
FIG. 2 is a diagram illustrating an example of components included in a memory device that may support memory device background operation management for low host battery, in accordance with the present disclosure.

FIG. 2 is a diagram illustrating an example 200 of components included in a memory device 120 that may support memory device background operation management for low host battery, in accordance with the present disclosure. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute the one or more instructions stored in the memory 140. Additionally, or alternatively, the controller 130 may receive one or more instructions from the host device 110 via the host interface 150, and may execute those one or more instructions. In some aspects, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some aspects, execution of the set of instructions, by the controller 130, causes the controller 130 and/or the memory device 120 to perform one or more operations or methods described herein. In some aspects, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some aspects, the controller 130 may translate a host interface command (e.g., a command received from the host device 110) into a memory interface command (e.g., a command for performing an operation on a memory array).

As shown in FIG. 2, the controller 130 may include a memory management component 225, among other examples. In some aspects, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform one or more background operations, such as refreshing, garbage collection, wear leveling, bad block management, block retirement, read disturb management, and/or other memory management operations. In some aspects, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

One or more devices or components shown in FIG. 2 may be configured to perform operations described herein, such as one or more operations and/or methods described in connection with FIGS. 5A, 5B, and 6-10. For example, the controller 130 and/or the memory management component 225, may be configured to perform one or more operations and/or methods for the memory device 120 as described herein.

For example, in some aspects, the memory device 120 may include means for obtaining, via a status register, a low battery status indication for a host device that indicates that the host device has a low battery level; and/or means for performing, in association with obtaining the low battery status indication, an action to defer or delay one or more background operations while the status register indicates the low battery status indication. In some aspects, the means for the memory device 120 to perform processes and/or operations described herein may include one or more components shown in FIG. 2, such as controller 130, and/or the memory management component 225, among other examples.

In some aspects, the host device 110 may include means for detecting that the host device has a low battery status using a comparison of a battery level of the host device to a low battery threshold; and/or means for providing, in association with detecting that the host device has the low battery status, a low battery status indication to a memory device via a status register to cause one or more background operations of the memory device to be deferred or unexecuted while the status register indicates the low battery status indication. In some aspects, the means for the host device 110 to perform processes and/or operations described herein may include one or more components described herein, such as a host controller.

In some aspects, the system 100 may include means for detecting that a host device of the memory system has a low battery status using a comparison of a battery level of the host device to a low battery threshold; means for setting, in association with detecting that the host device has the low battery status, a low battery status indication of a status register for a memory device of the memory system to indicate that the host device has the low battery status; and/or means for causing, in association with the status register indicating the low battery status indication, one or more background operations of the memory device to be deferred or unexecuted. In some aspects, the means for the host device 110 to perform processes and/or operations described herein may include one or more components described herein, such as the host device 110, a host controller, the host interface 150, the memory device 120, the controller 130, and/or the memory management component 225, among other examples.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
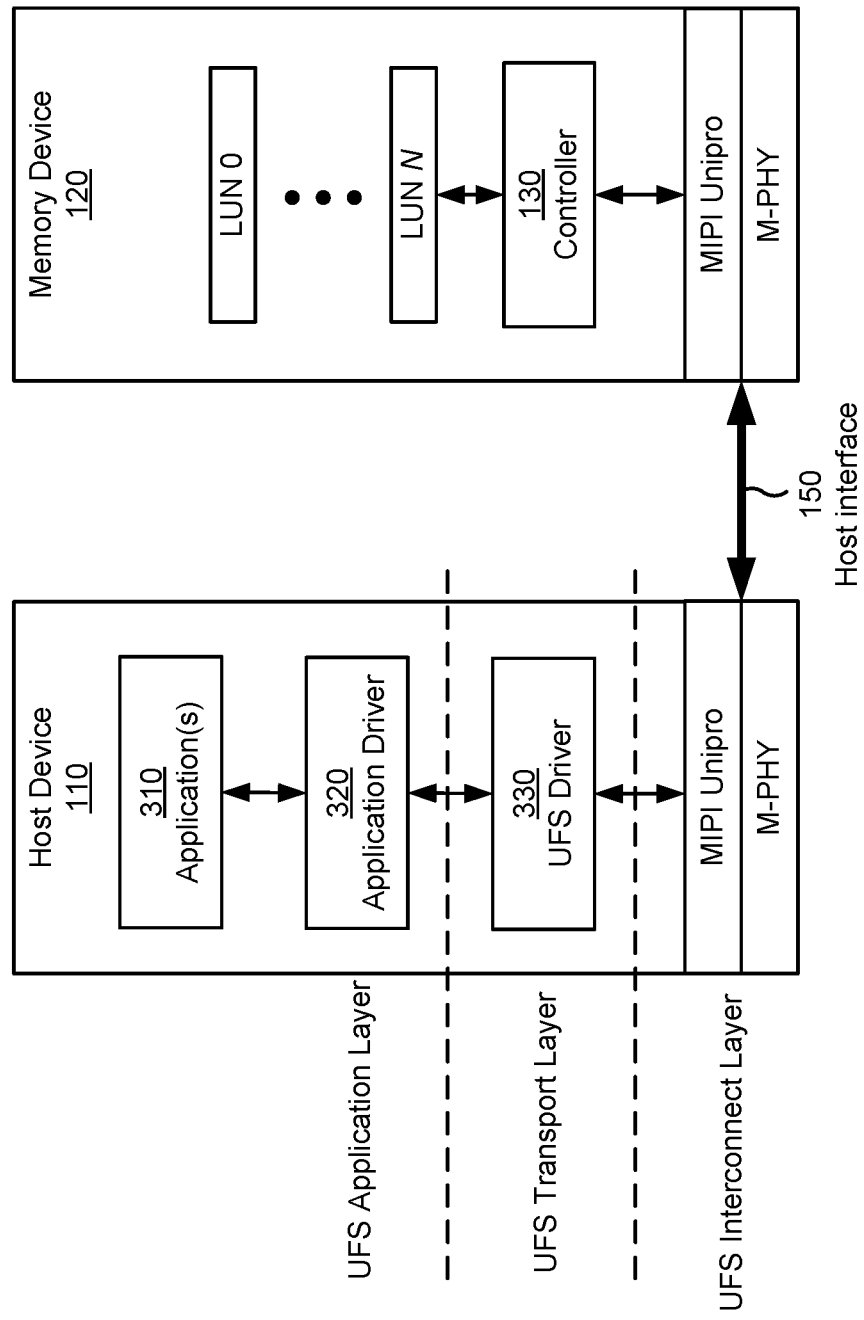
FIG. 3 is a diagram of an example of a universal flash storage (UFS) system, in accordance with the present disclosure.

FIG. 3 is a diagram of an example of a UFS system 300, in accordance with the present disclosure. The UFS system 200 may include a host device 110 and a memory device 120 (e.g., the system 100 or a memory device 120). The memory device 120 may include a non-volatile memory array (e.g., a flash memory array, such as a memory array 205) and a controller 130. The controller 130 may be a flash memory controller or a UFS controller.

As shown in FIG. 3, UFS may include a UFS application layer. The UFS application layer may be a layer in a UFS protocol stack associated with an interface between a file system of the host device 110 and the memory device 120, allowing an operating system and one or more applications 310 of the host device 110 to interact with the memory device 120. The UFS application layer (e.g., via an application driver 320, such as a SCSI driver) may abstract the complexities of flash memory management, wear-leveling, and/or error correction, reducing the complexity associated with applications to work with UFS storage.

The UFS protocol stack may include a UFS transport layer (UTP). The UFS transport layer may be associated with managing physical and data link aspects of communication between the host device 110 and the memory device 120 (e.g., via a UFS driver 330). The UFS transport layer may abstract the physical and low-level communication complexities, allowing the upper layers of the UFS protocol stack, such as the UFS application layer, to interact with the memory device 120. The UFS transport layer may be associated with performing operation(s) for physical layer management and data link layer management (e.g., UFS interconnect layer management), initialization and link configuration, and/or command queuing and transport layer protocols, among other examples. Transactions for the UFS transport layer may include packets referred to as UFS protocol information units (UPIUs). There may be different types of UPIUs for handling application commands, data operations, task management operations, and/or query operations, among other examples. Each transaction may include a command UPIU, zero or more data in or data out UPIUs, and a response UPIU.

The UFS protocol stack may include a UFS interconnect layer. The UFS interconnect layer may be the lowest layer of the UFS protocol stack. The UFS interconnect layer may handle the connection between the host device 110 and the memory device 120. As shown in FIG. 3, the UFS interconnect layer may include a universal protocol (UniPro) component that is configured to perform UniPro operations defined, or otherwise fixed, by the mobile industry processor interface (MIPI) alliance. The UniPro component may have four layers. Layer 1 may be a physical layer, layer 2 may be a data link layer, layer 3 may be a network layer, and layer 4 may be a transport layer. Layer 1 and layer 2 may ensure the data integrity and reliability of the communication link between the host device 110 and the memory device 120. Layer 3 and layer 4 may ensure that the data is routed to the intended UFS host or device. The UFS interconnect layer may include an M-PHY component (e.g., that uses a physical layer protocol defined, or otherwise fixed, by the MIPI Alliance). UFS may use the M-PHY component for physical layer operations and the UniPro component for data link layer operations.

As shown in FIG. 3, the memory device 120 may include one or more logical units (LUs). Each LU may have an identifier within a UFS referred to as a LU number (LUN), shown as LUN 0 through LUN N. An LU may be an independently (e.g., uniquely) addressable memory unit within the memory device 120 via logic block address (LBA). An LU may be a fixed-size unit of data that can be read from or written to within the memory device 120. LUs in UFS provide a level of abstraction that allows the host device 110 to perform operations with the memory device 120 without needing to understand the details of NAND flash memory management. The memory device 120 may expose one or more LUNs and respective logical address space, making it easier for a file system and application(s)

310 of the host device 110 to interact with the flash memory as if the memory device 120 were a traditional block-based device.

As indicated above, FIG. 3 is provided as an example. Other examples may differ from what is described with regard to FIG. 3.

Figure 4:
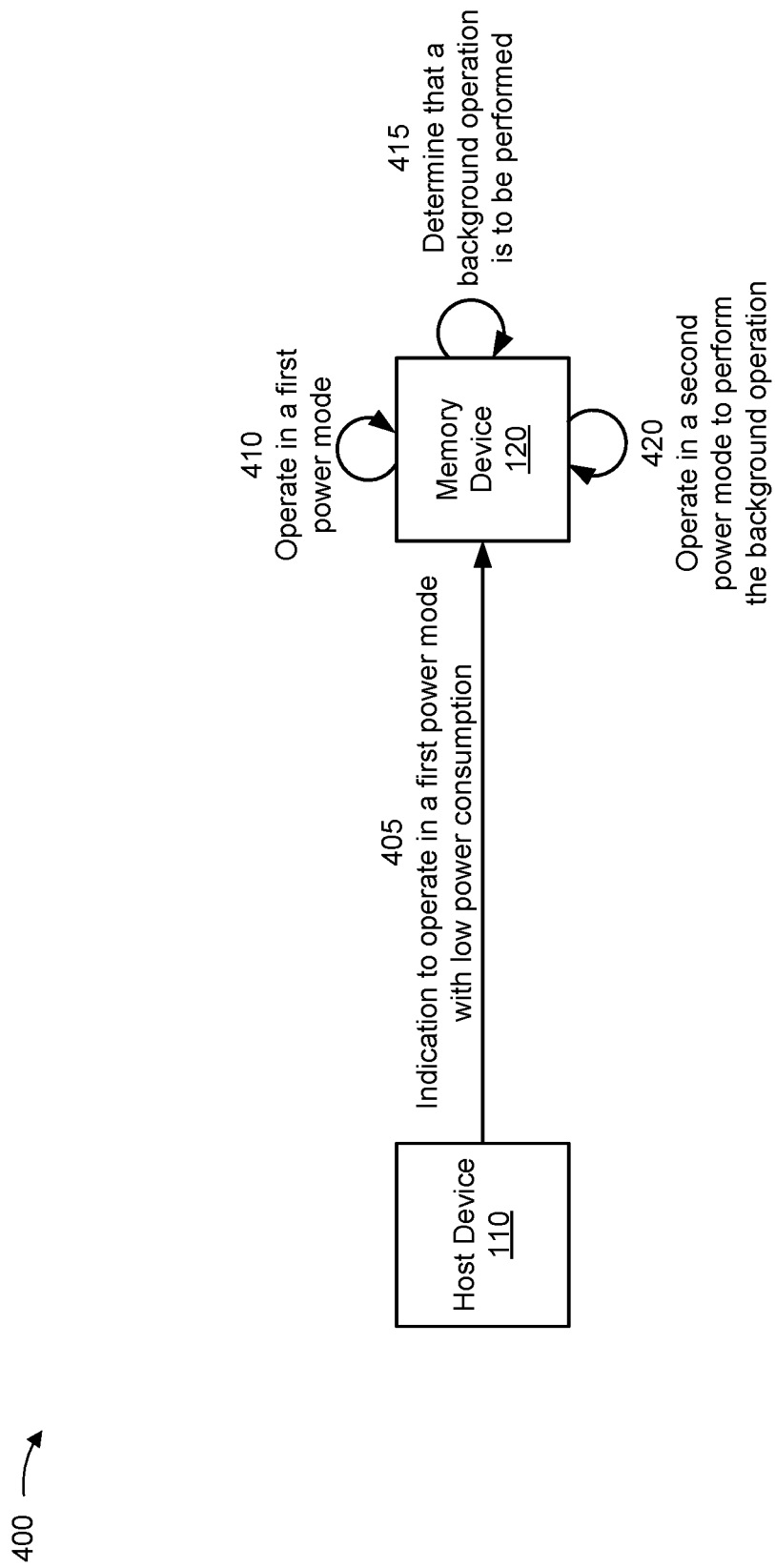
FIG. 4 is a diagram of an example of inefficient background operation for the memory device, in accordance with the present disclosure.

FIG. 4 is a diagram of an example 400 of inefficient background operation for the memory device 120, in accordance with the present disclosure.

As shown in FIG. 4, and by reference number 405, the host device 110 may transmit, and the memory device 120 may receive, an indication to operate in a first power mode. For example, the host device 110 may set a current power mode indicator or attribute of the memory device 120 to the first power mode via a status register. The status register may be memory that stores information about a current operational status and condition of the memory device 120, the host device 110, and/or the system 100. The current power mode indicator or attribute may be a bCurrentPowerMode attribute (e.g., as defined, or otherwise fixed, by a UFS specification promulgated by the JEDEC).

The first power mode may be associated with relatively low power consumption by the memory device 120 (e.g., as compared to other power modes that are configurable for the memory device 120). For example, the first power mode may be an idle power mode, a pre-active power mode, a pre-sleep power mode, a sleep power mode, a pre-power down power mode, or a power down power mode, among other examples. For example, to conserve power, the host device 110 may cause the memory device 120 to operate in a power mode in which the memory device 110 consumes a relatively low amount of power (e.g., via setting the current power mode indicator or attribute or another attribute (e.g., an active current consumption attribute (bActiveICCLevel)) to a lowest active level). As shown by reference number 410, the memory device 120 may operate in the first power mode based on, in response to, or otherwise associated with receiving the indication to operate in the first power mode.

As shown by reference number 415, the memory device 120 may determine that a background operation is to be performed by the memory device 120. For example, the memory device 120 may periodically perform the background operation. Additionally, or alternatively, the memory device 120 may detect an event that triggers the memory device 120 to perform the background operation. As an example, the background operation may be a refresh operation. The refresh operation may include the memory device 120 reading data from a memory location and re-writing the data to a second memory location (e.g., to reduce a likelihood of data loss caused by charge leakage over time or other issues).

The memory device 120 may be configured with a refresh frequency (e.g., via a bRefreshFreq attribute) and/or a refresh unit (e.g., via a bRefreshUnit attribute) defining a quantity of refresh operations that are to be performed over a given amount of time. A refresh operation may be scheduled in accordance with the refresh frequency and/or the refresh unit. The memory device 120 may initiate the refresh operation in accordance with the refresh operation being scheduled.

As another example, the background operation may include a garbage collection operation (e.g., to identify and consolidate valid data, erase blocks containing invalid data, and make the erased space available for new data), a wear leveling operation (e.g., to ensure that data is written to different physical locations in the memory), a read disturb management operation (e.g., to mitigate the impact of repeated read operations on neighboring cells), an error correction operation (e.g., using error correction codes to detect and/or correct errors in stored data), a power loss protection operation, a temperature and/or voltage monitoring operation, and/or a bad block management operation, among other examples. The memory device 120 may initiate the background operation (e.g., based on, in response to, or otherwise associated with determining that the background operation is to be performed).

As shown by reference number 420, the memory device 120 may operate in a second power mode to perform the background operation. The second power mode may cause the memory device 120 to consume more power as compared to operating in the first power mode. For example, based on initiating the background operation, the memory device 120 may set the power mode and/or a current consumption attribute to an active level to enable the memory device 120 to perform the background operation. As a result, the memory device 120 may consume more power than if the memory device 120 were operating in the first power mode (e.g., as set or otherwise configured by the host device 110).

As indicated above, FIG. 4 is provided as an example. Other examples may differ from what is described with regard to FIG. 4.

Figure 5A:
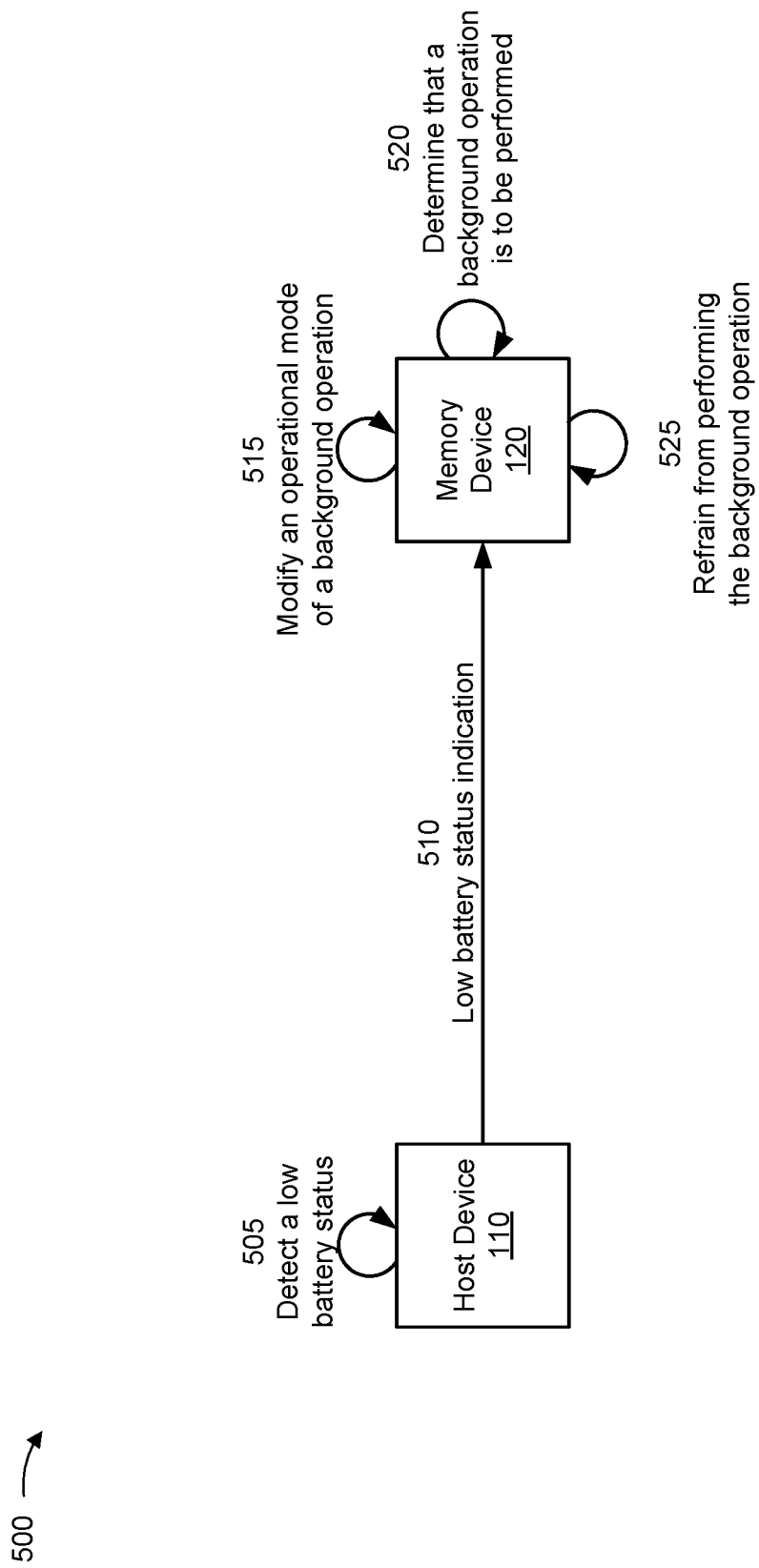
FIGS. 5A and 5B are diagrams of an example of memory device background operation management for low host battery, in accordance with the present disclosure.
Figure 5B:
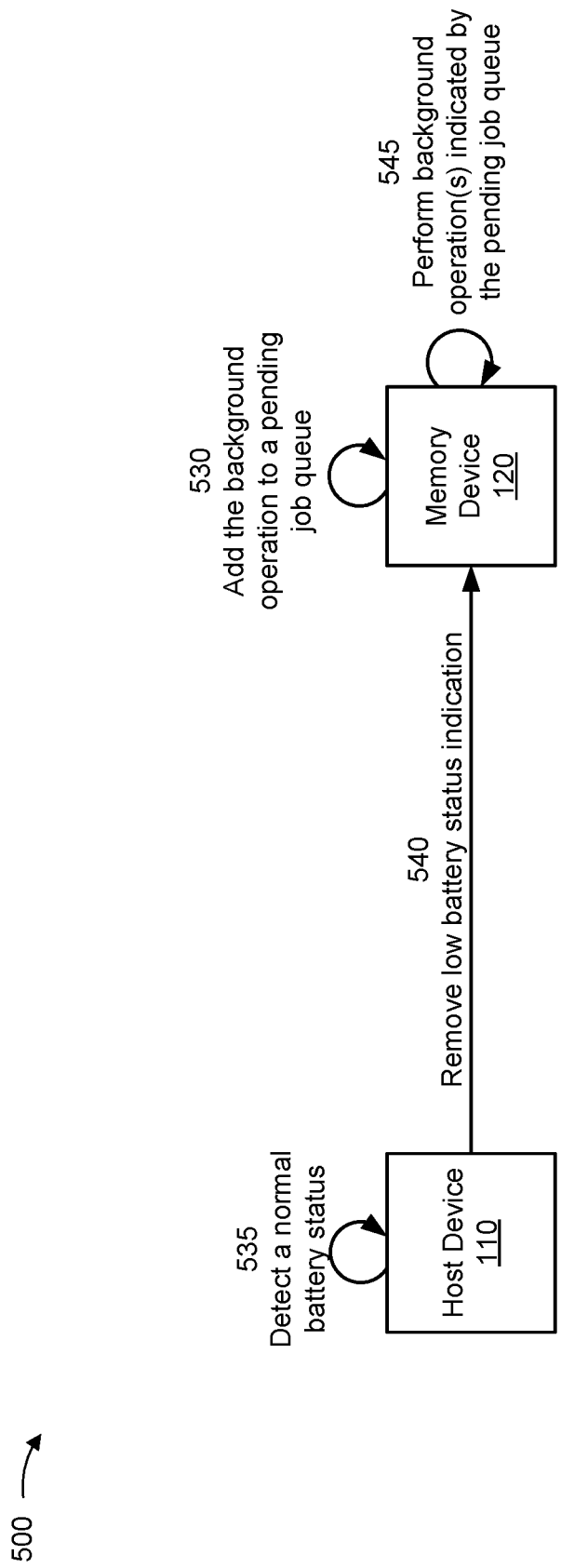

FIGS. 5A and 5B are diagrams of an example 500 of memory device background operation management for low host battery, in accordance with the present disclosure. As shown in FIGS. 5A and 5B, the host device 110 and the memory device 120 may communicate with each other (e.g., via the host interface 150 or another interface). The host device 110 and the memory device 120 may be included in a memory system, such as the system 100.

As shown in FIG. 5A, and by reference number 505, the host device 110 may detect a low battery status (or a low power status) of the host device 110. For example, the host device 110 may detect that the host device has a low battery status using a comparison of a battery level of the host device 110 to a low battery threshold (e.g., a bLowBatteryThreshold attribute). For example, the host device 110 may detect that the battery level of the host device 110 satisfies (or does not satisfy) the low battery threshold. As an example, if the host device 110 determines that a current battery level is less than or equal to the low battery threshold, then the host device 110 may detect the low battery status. As another example, the host device 110 may detect a command (e.g., a user input or another command) indicating that the host device 110 is in a low power state.

The low battery threshold may be a configurable parameter or attribute. For example, the low battery threshold may be configurable by or for the host device 110. For example, the low battery threshold may be an attribute or parameter for a status register of the host device 110 (e.g., there may be a host configurable low battery threshold register).

As shown by reference number 510, the host device 110 may transmit or provide, and the memory device 120 may receive or obtain, a low battery status indication. The host device 110 may provide the low battery stratus indication via a status register of the memory device 110. For example, the status register may include a low battery status parameter or attribute (e.g., a bLowBatteryStatus attribute). The host device 110 may provide the low battery status indication by setting the low battery status parameter or attribute in the status register to a value that indicates that the host device 110 currently has the low battery status.

As described in more detail elsewhere herein, providing the low battery status indication may cause one or more background operations of the memory device 120 to be deferred or unexecuted while the status register indicates the low battery status indication. For example, the low battery status indication may enable the memory device 120 to determine when the host device 110 has the low battery status. This enables the memory device 120 to perform appropriate operation(s) for background operations. For example, the memory device 120 may perform improved background operation management for power savings (e.g., as compared to when the power mode of the memory device 120 is set without any indication as to the reason why the power mode is set in a given power mode).

For example, the memory device 120 may perform an action to defer or delay one or more background operations while the status register indicates the low battery status indication. The memory device 120 performing the action may be based on, in response to, or otherwise associated with obtaining the low battery status indication from the host device 110.

In some aspects, the action may include modifying or switching an operational mode of one or more background operations. For example, as shown by reference number 515, the memory device 120 may modify an operational mode of a background operation (e.g., based on, in response to, or otherwise associated with obtaining the low battery status indication from the host device 110). The operational mode may define how the background operation is performed, if the background operation is performed, and/or which device or component controls or manages the performance of the background operation, among other examples. As an example, the memory device 120 may switch the operational mode to a mode in which the background operation is not performed and/or in which the host device 110 controls or otherwise manages the performance of the background operation. For example, the memory device 120 may switch the operational mode to a mode in which the host device 110 controls or otherwise manages the performance of the background operation because the host device 110 may have more information relating to the power and/or battery status of the host device 110 (and/or of the system 100), enabling the host device 110 to make improved determinations as to when and/or if the background operation should be performed.

As an example, operational modes for a refresh operation may include a forced mode (e.g., a manual-forced mode) and a selective mode (e.g., a manual-selective mode). In the selective mode, the memory device may only refresh memory blocks that need to be refreshed, such as memory blocks that contain data and are considered (e.g., by the memory device 120) to be in need of refreshing. A memory block may be the smallest unit of memory that can be erased. In other words, an individual page of a block cannot be erased without erasing every other page g40 of the block. A page is the smallest unit of memory to which data can be written (i.e., the smallest unit of memory that can be programmed with data). For example, memory architecture of the memory device 120 may include a die that includes one or more planes (e.g., a memory plane). Each plane includes multiple blocks (e.g., memory blocks) and each block includes multiple pages. In the forced mode, the memory device may perform a refresh operation as instructed or commanded by the host device 110 (e.g., regardless of whether the block to be refreshed is considered (e.g., by the memory device 120) to be in need of refreshing).

If the memory device 120 is in the selective mode for the refresh operation, then the memory device 120 may switch from the selective mode to the forced mode for the refresh operation. For example, if the low battery status indication is set (e.g., in the status register of the memory device 120) and the operational mode of the refresh operation is set as the selective mode (e.g., via a refresh method attribute), then the memory device 120 may switch the operational mode of the refresh operation to the forced mode (e.g., by setting the refresh method attribute to indicate the forced mode). This may enable the host device 120 to control and/or defer the refresh operation to a later point in time (e.g., to conserve power or battery), such as by interrupting a RefreshEnable attribute and updating a refresh frequency attribute.

Alternatively, if the low battery status indication is set (e.g., in the status register of the memory device 120) and the operational mode of the refresh operation is set as the forced mode, then the host device 120 may reconfigure the refresh operation or defer the refresh operation by setting the RefreshEnable attribute (e.g., to cause the refresh operation to occur at a later point in time). For example, the host device 110 may provide, and the memory device 120 may obtain an indication of a modification of a refresh frequency associated with the refresh operation (e.g., based in, in response to, or otherwise associated with the low battery status indication being set). Additionally, or alternatively, the host device 110 may provide, and the memory device 120 may obtain, an indication that the refresh operation is to be disabled (e.g., based in, in response to, or otherwise associated with the low battery status indication being set). In such example, the memory device 120 may disable the refresh operation.

As another example, the action may include disabling exception event control indications for background operations. For example, the memory device 120 may clear, in association with the status register indicating the low battery status indication, an exception event status indication associated with the exception event control indication for urgent background operations. For example, obtaining the low battery status indication may cause an exception event control indication for urgent background operations to be disabled. For example, before initiating a background operation, the memory device 120 may check if the low battery status indication is set in the status register. If the low battery status indication is set, then the exception event control indication for urgent background operations may be disabled by clearing an exception event status bit (e.g., bit 2 for urgent_bkops as defined, or otherwise fixed, by a UFS specification).

As shown by reference number 520, the memory device 120 may determine that a background operation is to be performed. For example, the memory device 120 may periodically perform the background operation. Additionally, or alternatively, the memory device 120 may detect an event that triggers the memory device 120 to perform the background operation. As an example, the background operation may be a refresh operation. The refresh operation may include the memory device 120 reading data from a memory location and re-writing the data to a second memory location (e.g., to reduce a likelihood of data loss caused by charge leakage over time or other issues).

The memory device 120 may be configured with a refresh frequency (e.g., via a bRefreshFreq attribute) and/or a refresh unit (e.g., via a bRefreshUnit attribute) defining a quantity of refresh operations that are to be performed over a given amount of time. A refresh operation may be scheduled in accordance with the refresh frequency and/or the refresh unit. The memory device 120 may initiate the refresh operation in accordance with the refresh operation being scheduled.

As another example, the background operation may include a garbage collection operation (e.g., to identify and consolidate valid data, erase blocks containing invalid data, and make the erased space available for new data), a wear leveling operation (e.g., to ensure that data is written to different physical locations in the memory), a read disturb management operation (e.g., to mitigate the impact of repeated read operations on neighboring cells), an error correction operation (e.g., using error correction codes to detect and/or correct errors in stored data), a power loss protection operation, a temperature and/or voltage monitoring operation, and/or a bad block management operation, among other examples. The memory device 120 may initiate the background operation (e.g., based on, in response to, or otherwise associated with determining that the background operation is to be performed).

As shown by reference number 525, the memory device 120 may refrain from performing the background operation. For example, the memory device 120 may refrain from performing the background operation based on, in response to, or otherwise associated with obtaining the low battery status indication. For example, before initiating the background operation, the memory device may check the low battery status indication (e.g., bit) in the status register. If the low battery status indication is set, then the memory device 120 may not execute the background operation (e.g., refrain from performing the background operation) and/or may defer or delay the performance of the background operation.

As shown in FIG. 5B, and by reference number 530, the memory device 120 may add a background operation that was unexecuted or deferred to a pending job queue. For example, the memory device 120 may maintain a list or queue of background operations that were not performed because the low battery status indication was set. For example, if the low battery status indication is set, then the memory device 120 may push a command for a background operation to a pending job queue (e.g., a list of pending jobs or tasks to be performed by the memory device 120).

As shown by reference number 535, the host device 110 may detect a normal battery status. For example, the host device 110 may detect that a battery level of the host device 110 has improved sufficiently so as to no longer have the low battery status. In some aspects, the host device 110 may detect, after providing the low battery status indication, that the host device 110 no longer has the low battery status (e.g., that the host device 110 has a normal battery status). In some aspects, the host device 110 may detect the normal battery status based on, in response to, or otherwise associated with detecting that the battery level is greater than the low battery threshold by an amount that satisfies a threshold. For example, the host device 110 may determine that a current battery level of the host device 110 is at least N % greater than the low battery threshold. As another example, the host device 110 may detect the normal battery status based on detecting that the host device 110 and/or the system 100 is connected to a power source.

As shown by reference number 540, the host device 110 may remove the low battery status indication. For example, the host device 110 may remove the low battery status based on, in response to, or otherwise associated with detecting the normal battery status. The host device 110 may provide, and the memory device 120 may obtain, an indication that the host device 110 is no longer associated with the low battery status. The indication that the host device 110 is no longer associated with the low battery status may cause one or more background operations to be performed by the memory device 120. In some aspects, the host device 110 may provide the indication that the host device 110 is no longer associated with the low battery status by providing, to the memory device 110, an interrupt communication. For example, the interrupt communication may indicate that the memory device 120 is to resume internal operations. For example, the interrupt communication may be a resume_internal_ops_notify communication (e.g., as defined, or otherwise fixed, by a UFS specification).

As shown by reference number 545, the memory device 120 may perform one or more background operations indicated by the pending job queue (e.g., based on, in response to, or otherwise associated with obtaining the indication that the host device 110 is no longer associated with the low battery status). For example, the memory device 120 may process commands indicated by the pending job queue, such as commands for respective background operations that were deferred while the low battery status indication was set. The pending job queue may enable the memory device 120 to track or maintain a list of one or more background operations that were deferred while the low battery status indication was set. As a result, the memory device 120 may conserve power or battery resources by not performing or executing the background operations while the host device 110 has low battery, but may also ensure that the background operations are performed after battery conditions of the host device 110 improve. Ensuring that the deferred background operations are performed may improve reliability, integrity, and/or performance of data storage by the memory device 120.

Additionally, the memory device 120 may resume the execution or performance of background operations based on, in response to, or otherwise associated with obtaining the indication that the host device 110 is no longer associated with the low battery status. For example, after battery conditions of the hose device 110 improve, the memory device 120 may resume performing background operations as normal.

As indicated above, FIGS. 5A and 5B are provided as examples. Other examples may differ from what is described with regard to FIGS. 5A and 5B.

Figure 6:
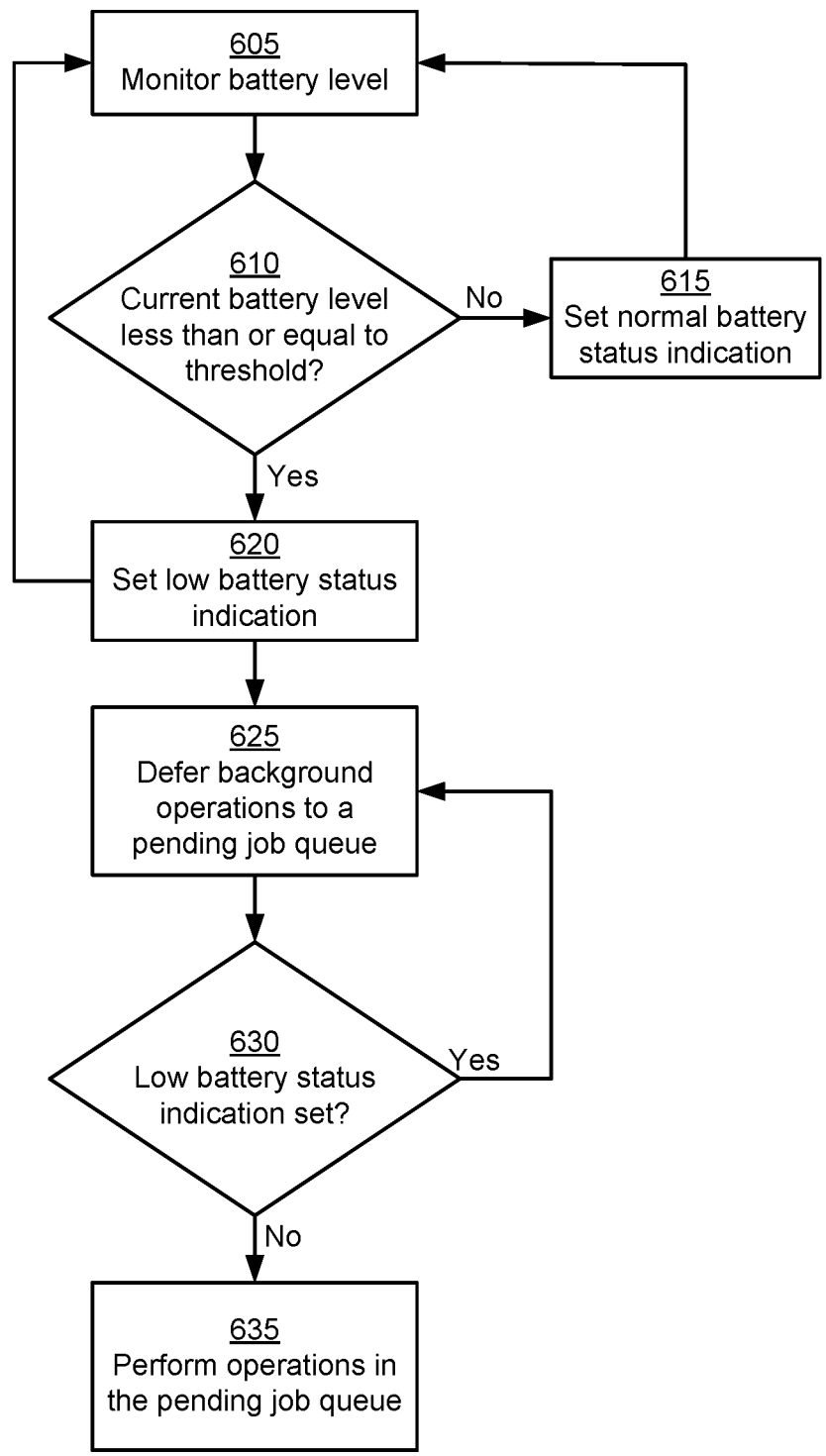
FIG. 6 is a diagram of an example process of memory device background operation management for low host battery, in accordance with the present disclosure.

FIG. 6 is a diagram of an example process 600 of memory device background operation management for low host battery, in accordance with the present disclosure. The one or more process blocks of FIG. 6 may be performed by the system 100, the host device 110, and/or the memory device 120.

As shown in FIG. 6, the process 600 may include monitoring a battery level (block 605). For example, the system 100 and/or the host device 110 may monitor the battery level. The battery level may be a current battery level of the host device 110.

The process 600 may include determining whether the current battery level is less than or equal to a threshold (block 610). For example, the system 100 and/or the host device 110 may determine whether the current battery level is less than or equal to a threshold. The threshold may be a low battery threshold. The low battery threshold may be a configurable value. For example, the host device 110 may configure the low battery threshold. As another example, the host device 110 may be configured with the low battery threshold (e.g., via an original equipment manufacturer (OEM) configuration). If the current battery level is not less than or equal to the threshold (block 610—No), then the process 600 may include setting a normal battery status indication (block 615). For example, setting the normal battery status indication may include setting a value of a low battery status indication bit (e.g., in a status register) to a value that indicates a normal battery status or that indicates the low battery status is not present. The process 600 may include continuing to monitor the battery level (block 605) after setting the normal battery status indication.

If the current battery level is less than or equal to the threshold (block 610—Yes), then the process 600 may include setting a low battery status indication (block 620). For example, the system 100 and/or the host device 110 may set or configure the low battery status indication via a status register. For example, the system 100 and/or the host device 110 may a value of the low battery status indication bit (e.g., in the status register) to a value that indicates the low battery status is present. The process 600 may include continuing to monitor the battery level (block 605) after setting the low battery status indication. The memory device 120 may obtain the low battery status indication via the status register.

The process 600 may include deferring background operations to a pending job queue (block 625). For example, the system 100 and/or the memory device 120 may defer background operations (e.g., of the memory device 120) to a pending job queue. In other words, if the low battery status indication is set, then the system 100 and/or the memory device 110 may refrain from performing one or more background operations. Instead, the system 100 and/or the memory device 120 may defer the performance of the background operations (e.g., while the low battery status indication is set). The system 100 and/or the memory device 120 may store an indication of any background operations that were otherwise to be performed (e.g., while the low battery status indication is set) in the pending job queue.

The process 600 may include determining whether the low battery status indication is set (block 630). For example, the system 100 and/or the memory device 120 may determine whether the low battery status indication is set (e.g., via the status register). If the low battery status indication is set (block 630—Yes), then the system 100 and/or the memory device 120 may continue to defer the background operations of the memory device 120 (block 625). If the low battery status indication is not set (block 630—No), then the process 600 may include performing operations (e.g., background operations) in the pending job queue (block 635). For example, the system 100 and/or the memory device 120 may perform one or more background operations that are indicated by the pending job queue. The system 100 and/or the memory device 110 may process any commands indicated by the pending job queue after the low battery status indication is removed (e.g., by the host device 110).

As indicated above, FIG. 6 is provided as an example. Other examples may differ from what is described with regard to FIG. 6.

Figure 7:
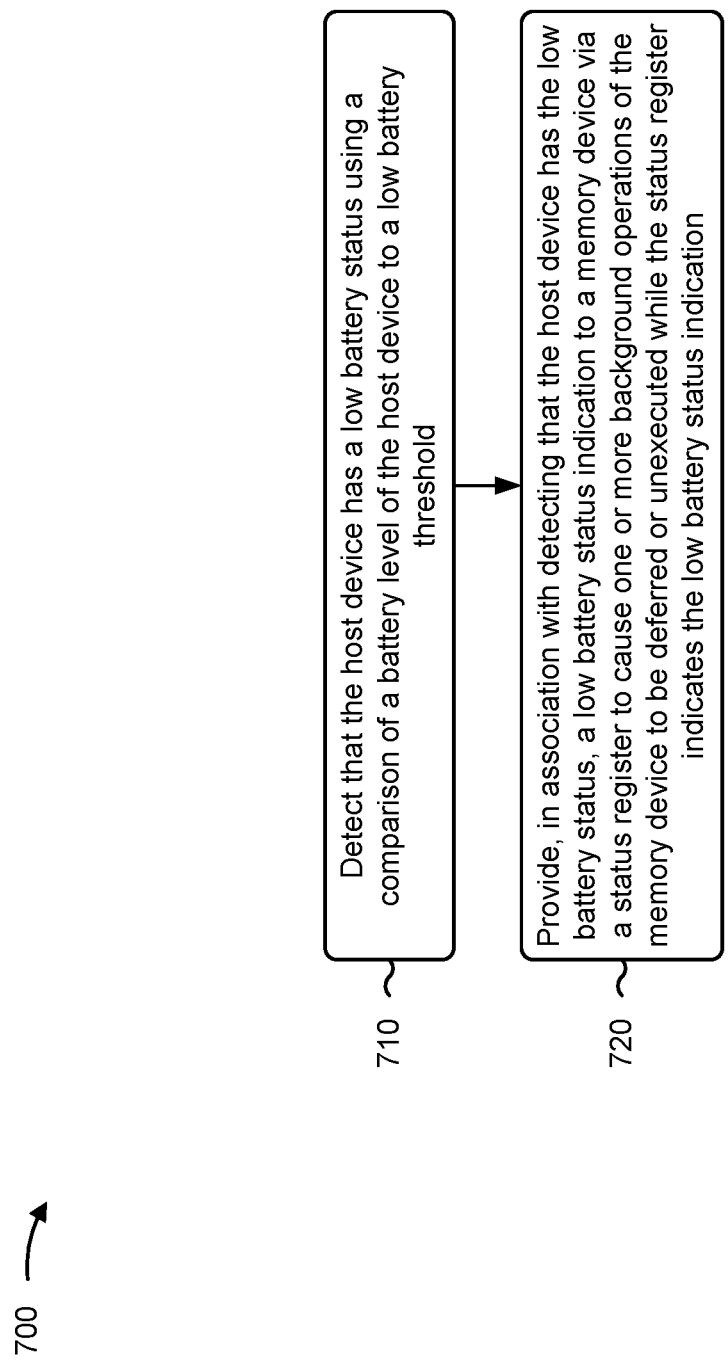
FIG. 7 is a flowchart of an example process associated with memory device background operation management for low host battery, in accordance with the present disclosure.

FIG. 7 is a flowchart of an example process 700 associated with memory device background operation management for low host battery, in accordance with the present disclosure. In some aspects, one or more process blocks of FIG. 7 are performed by a host device (e.g., host device 110). In some aspects, one or more process blocks of FIG. 7 are performed by another device or a group of devices separate from or including the memory, such as the memory device 120. Additionally, or alternatively, one or more process blocks of FIG. 7 may be performed by one or more components of the system 100, such as the memory management component 225, and/or a host controller, among other examples.

As shown in FIG. 7, process 700 may include detecting that the host device has a low battery status using a comparison of a battery level of the host device to a low battery threshold (block 710). For example, the host device may detect that the host device has a low battery status using a comparison of a battery level of the host device to a low battery threshold, as described above.

As further shown in FIG. 7, process 700 may include providing, in association with detecting that the host device has the low battery status, a low battery status indication to a memory device via a status register to cause one or more background operations of the memory device to be deferred or unexecuted while the status register indicates the low battery status indication (block 720). For example, the host device may provide, in association with detecting that the host device has the low battery status, a low battery status indication to a memory device via a status register to cause one or more background operations of the memory device to be deferred or unexecuted while the status register indicates the low battery status indication, as described above.

Process 700 may include additional aspects, such as any single aspect or any combination of aspects described below and/or in connection with one or more other processes described elsewhere herein.

In a first aspect, process 700 includes detecting, after providing the low battery status indication, that the host device no longer has the low battery status, and providing, to the memory device, an indication that the host device is no longer associated with the low battery status to cause the one or more background operations to be performed.

In a second aspect, alone or in combination with the first aspect, the indication that the host device is no longer associated with the low battery status is included in an interrupt communication.

In a third aspect, alone or in combination with one or more of the first and second aspects, detecting that the host device no longer has the low battery status includes detecting that the battery level is greater than the low battery threshold by an amount that satisfies a threshold.

In a fourth aspect, alone or in combination with one or more of the first through third aspects, providing the indication that the host device is no longer associated with the low battery status includes setting, via the status register, a parameter associated with the low battery status indication to a value that indicates that the host device is no longer associated with the low battery status.

In a fifth aspect, alone or in combination with one or more of the first through fourth aspects, the one or more background operations include a refresh operation, wherein the memory device is in a selective mode for the refresh operation, and the method further includes causing the memory device to switch from the selective mode to a forced mode for the refresh operation.

In a sixth aspect, alone or in combination with one or more of the first through fifth aspects, the selective mode is associated with the memory device selectively performing the refresh operation, and wherein the forced mode is associated with the host device controlling the refresh operation.

In a seventh aspect, alone or in combination with one or more of the first through sixth aspects, causing the memory device to switch from the selective mode to the forced mode includes providing, to the memory device, an indication that the refresh operation is disabled, and modifying a refresh frequency associated with the refresh operation.

In an eighth aspect, alone or in combination with one or more of the first through seventh aspects, the one or more background operations include a refresh operation, wherein the memory device is in a forced mode for the refresh operation, and the method further includes providing, to the memory device, an indication that the refresh operation is disabled.

In a ninth aspect, alone or in combination with one or more of the first through eighth aspects, providing the low battery status indication causes an exception event control indication for urgent background operations to be disabled.

In a tenth aspect, alone or in combination with one or more of the first through ninth aspects, the one or more background operations include at least one of a refresh operation, a garbage collection operation, a wear leveling operation, or a purge operation.

Although FIG. 7 shows example blocks of process 700, in some aspects, process 700 includes additional blocks, fewer blocks, different blocks, or differently arranged blocks than those depicted in FIG. 7. Additionally, or alternatively, two or more of the blocks of process 700 may be performed in parallel.

Figure 8:
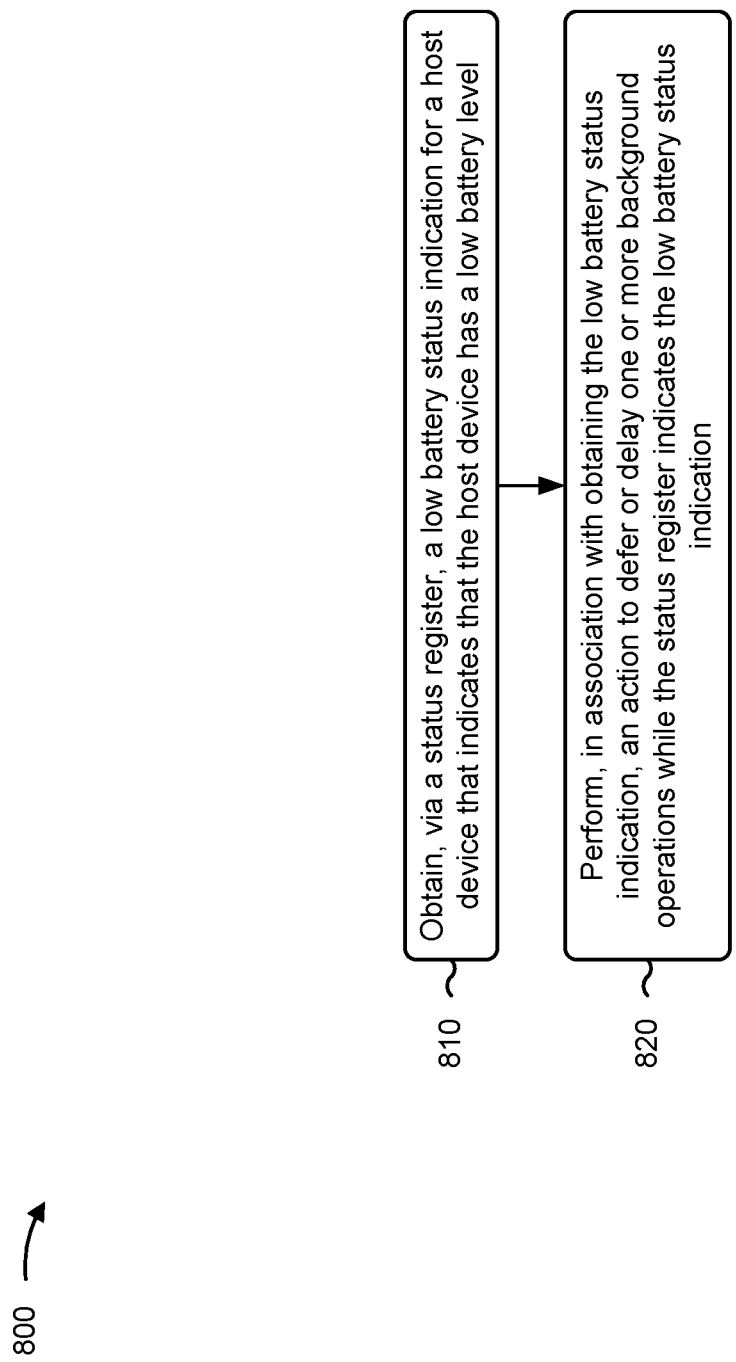
FIG. 8 is a flowchart of an example process associated with memory device background operation management for low host battery, in accordance with the present disclosure.

FIG. 8 is a flowchart of an example process 800 associated with memory device background operation management for low host battery, in accordance with the present disclosure. In some aspects, one or more process blocks of FIG. 8 are performed by a memory device (e.g., memory device 120). In some aspects, one or more process blocks of FIG. 7 are performed by another device or a group of devices separate from or including the memory, such as the host device 110. Additionally, or alternatively, one or more process blocks of FIG. 7 may be performed by one or more components of the system 100, such as the controller 130, the memory management component 225, and/or a host controller, among other examples.

As shown in FIG. 8, process 800 may include obtaining, via a status register, a low battery status indication for a host device that indicates that the host device has a low battery level (block 810). For example, the memory device may obtain, via a status register, a low battery status indication for a host device that indicates that the host device has a low battery level, as described above.

As further shown in FIG. 8, process 800 may include performing, in association with obtaining the low battery status indication, an action to defer or delay one or more background operations while the status register indicates the low battery status indication (block 820). For example, the memory device may perform, in association with obtaining the low battery status indication, an action to defer or delay one or more background operations while the status register indicates the low battery status indication, as described above.

Process 800 may include additional aspects, such as any single aspect or any combination of aspects described below and/or in connection with one or more other processes described elsewhere herein.

In a first aspect, performing the action includes refraining from performing the one or more background operations while the status register indicates the low battery status indication.

In a second aspect, alone or in combination with the first aspect, performing the action includes detecting a background operation, of the one or more background operations, that is to be performed while the status register indicates the low battery status indication, and providing an indication of the background operation to a queue associated with pending operations.

In a third aspect, alone or in combination with one or more of the first and second aspects, process 800 includes obtaining an indication that the host device is no longer associated with the low battery level, and performing, in association with the host device no longer being associated with the low battery level, any background operations, including the background operation, included in the queue.

In a fourth aspect, alone or in combination with one or more of the first through third aspects, process 800 includes obtaining, from the host device, an indication that the host device is no longer associated with the low battery level, and resuming, in association with the host device no longer being associated with the low battery level, the one or more background operations.

In a fifth aspect, alone or in combination with one or more of the first through fourth aspects, the indication that the host device is no longer associated with the low battery level is included in an interrupt communication.

In a sixth aspect, alone or in combination with one or more of the first through fifth aspects, obtaining the indication that the host device is no longer associated with the low battery level includes detecting, via the status register, that a parameter associated with the low battery status indication is set to a value that indicates that the host device is no longer associated with the low battery level.

In a seventh aspect, alone or in combination with one or more of the first through sixth aspects, the one or more background operations include a refresh operation, wherein the memory device is in a selective mode for the refresh operation, and wherein performing the action includes switching from the selective mode to a forced mode for the refresh operation.

In an eighth aspect, alone or in combination with one or more of the first through seventh aspects, the selective mode is associated with the memory device selectively performing the refresh operation, and wherein the forced mode is associated with the host device controlling the refresh operation.

In a ninth aspect, alone or in combination with one or more of the first through eighth aspects, performing the action includes obtaining, from the host device, an indication that the refresh operation is disabled, and obtaining, from the host device, an indication of a modification of a refresh frequency associated with the refresh operation.

In a tenth aspect, alone or in combination with one or more of the first through ninth aspects, the one or more background operations include a refresh operation, wherein the memory device is in a forced mode for the refresh operation, and wherein performing the action includes obtaining, from the host device, an indication that the refresh operation is to be disabled, and disabling the refresh operation.

In an eleventh aspect, alone or in combination with one or more of the first through tenth aspects, obtaining the low battery status indication causes an exception event control indication for urgent background operations to be disabled.

In a twelfth aspect, alone or in combination with one or more of the first through eleventh aspects, performing the action includes clearing, in association with the status register indicating the low battery status indication, an exception event status indication associated with the exception event control indication for urgent background operations.

In a thirteenth aspect, alone or in combination with one or more of the first through twelfth aspects, the one or more background operations include at least one of a refresh operation, a garbage collection operation, a wear leveling operation, or a purge operation.

Although FIG. 8 shows example blocks of process 800, in some aspects, process 800 includes additional blocks, fewer blocks, different blocks, or differently arranged blocks than those depicted in FIG. 8. Additionally, or alternatively, two or more of the blocks of process 800 may be performed in parallel.

Figure 9:
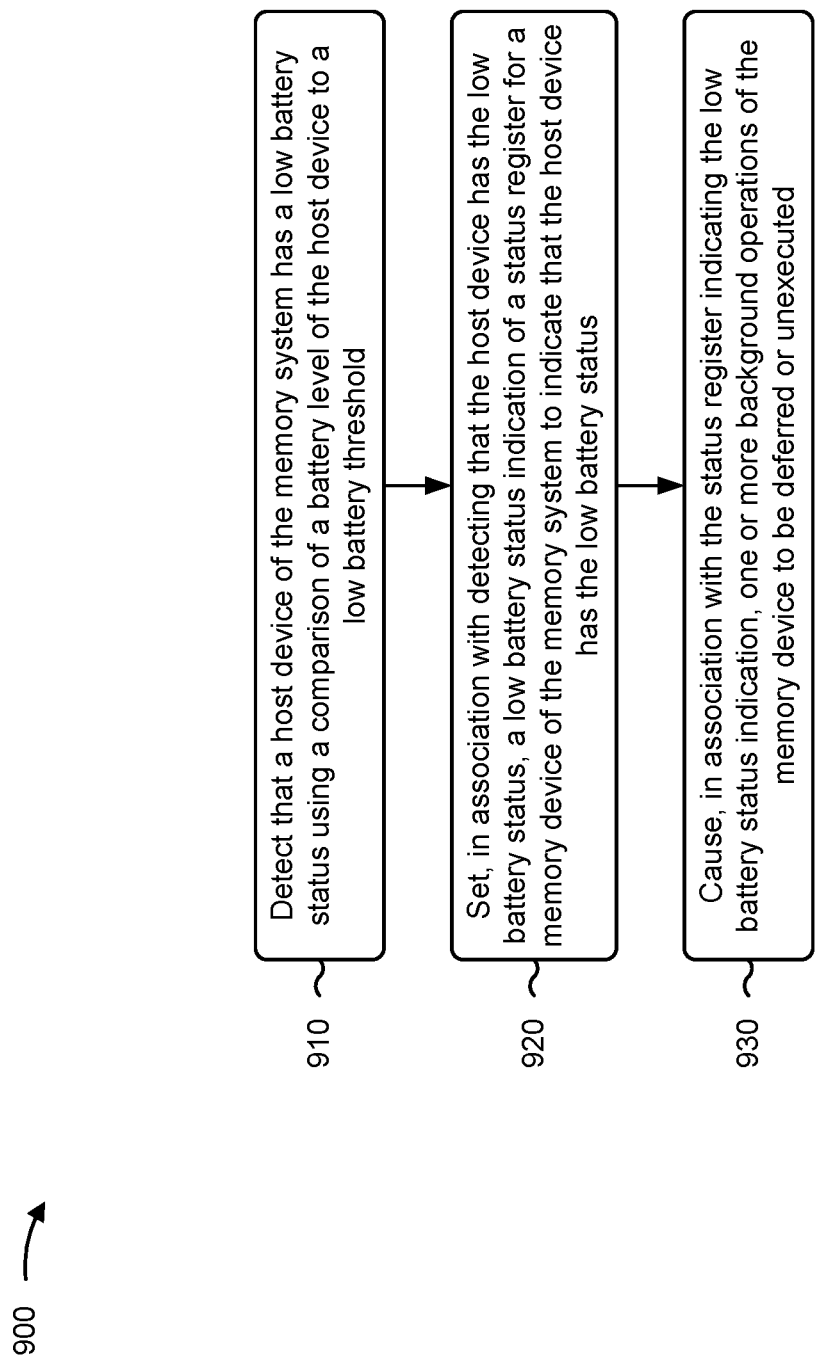
FIG. 9 is a flowchart of an example process associated with memory device background operation management for low host battery, in accordance with the present disclosure.

FIG. 9 is a flowchart of an example process 900 associated with memory device background operation management for low host battery, in accordance with the present disclosure. In some aspects, one or more process blocks of FIG. 9 are performed by a memory system (e.g., system 100). In some aspects, one or more process blocks of FIG. 7 are performed by another device or a group of devices separate from or including the memory, such as the host device 110 and/or the memory device 120. Additionally, or alternatively, one or more process blocks of FIG. 7 may be performed by one or more components of the system 100, such as the controller 130, the memory management component 225, and/or a host controller, among other examples As shown in FIG. 9, process 900 may include detecting that a host device of the memory system has a low battery status using a comparison of a battery level of the host device to a low battery threshold (block 910). For example, the memory system may detect that a host device of the memory system has a low battery status using a comparison of a battery level of the host device to a low battery threshold, as described above.

As further shown in FIG. 9, process 900 may include setting, in association with detecting that the host device has the low battery status, a low battery status indication of a status register for a memory device of the memory system to indicate that the host device has the low battery status (block 920). For example, the memory system may set, in association with detecting that the host device has the low battery status, a low battery status indication of a status register for a memory device of the memory system to indicate that the host device has the low battery status, as described above.

As further shown in FIG. 9, process 900 may include causing, in association with the status register indicating the low battery status indication, one or more background operations of the memory device to be deferred or unexecuted (block 930). For example, the memory system may cause, in association with the status register indicating the low battery status indication, one or more background operations of the memory device to be deferred or unexecuted, as described above.

Process 900 may include additional aspects, such as any single aspect or any combination of aspects described below and/or in connection with one or more other processes described elsewhere herein.

In a first aspect, causing the one or more background operations of the memory device to be deferred or unexecuted includes refraining from performing the one or more background operations while the status register indicates the low battery status indication.

In a second aspect, alone or in combination with the first aspect, process 900 includes detecting a background operation, of the one or more background operations, that is to be performed by the memory device while the status register indicates the low battery status indication, and providing an indication of the background operation to a queue associated with pending operations for the memory device.

In a third aspect, alone or in combination with one or more of the first and second aspects, process 900 includes detecting, after setting the low battery status indication, that the host device of no longer has the low battery status, setting, via the status register, the low battery status indication to a value that indicates that the host device no longer has the low battery status, and performing, via the memory device and in association with the host device no longer having the low battery status, any background operations, including the background operation, included in the queue.

In a fourth aspect, alone or in combination with one or more of the first through third aspects, process 900 includes detecting, after providing the low battery status indication, that the battery level satisfies the low battery threshold, providing, to the memory device, an indication that the host device is no longer associated with the low battery status, and causing the one or more background operations to be performed by the memory device.

In a fifth aspect, alone or in combination with one or more of the first through fourth aspects, the indication that the host device no longer has the low battery status is included in an interrupt communication.

In a sixth aspect, alone or in combination with one or more of the first through fifth aspects, detecting that the host device no longer has the low battery status includes detecting that the battery level is greater than the low battery threshold by an amount that satisfies a threshold.

In a seventh aspect, alone or in combination with one or more of the first through sixth aspects, providing the indication that the host device no longer has the low battery status includes setting, via the status register, the low battery status indication to a value that indicates that the host device no longer has the low battery status.

In an eighth aspect, alone or in combination with one or more of the first through seventh aspects, the one or more background operations include a refresh operation, wherein the memory device is in a selective mode for the refresh operation, and wherein causing the one or more background operations of the memory device to be deferred or unexecuted includes switching the memory device from the selective mode to a forced mode for the refresh operation.

In a ninth aspect, alone or in combination with one or more of the first through eighth aspects, the selective mode is associated with the memory device selectively performing the refresh operation, and wherein the forced mode is associated with the host device controlling the refresh operation.

In a tenth aspect, alone or in combination with one or more of the first through ninth aspects, process 900 includes providing, from the host device to the memory device, an indication that the refresh operation is disabled, and providing, from the host device to the memory device, an indication of a modification of a refresh frequency associated with the refresh operation.

In an eleventh aspect, alone or in combination with one or more of the first through tenth aspects, the one or more background operations include a refresh operation, wherein the memory device is in a forced mode for the refresh operation, and wherein causing the one or more background operations of the memory device to be deferred or unexecuted includes providing, to the memory device, an indication that the refresh operation is to be disabled, and disabling the refresh operation for the memory device.

In a twelfth aspect, alone or in combination with one or more of the first through eleventh aspects, obtaining the low battery status indication causes an exception event control indication for urgent background operations to be disabled.

In a thirteenth aspect, alone or in combination with one or more of the first through twelfth aspects, causing the one or more background operations of the memory device to be deferred or unexecuted includes clearing, in association with the status register indicating the low battery status indication, an exception event status indication associated with the exception event control indication for urgent background operations.

In a fourteenth aspect, alone or in combination with one or more of the first through thirteenth aspects, the one or more background operations include at least one of a refresh operation, a garbage collection operation, a wear leveling operation, or a purge operation.

Although FIG. 9 shows example blocks of process 900, in some aspects, process 900 includes additional blocks, fewer blocks, different blocks, or differently arranged blocks than those depicted in FIG. 9. Additionally, or alternatively, two or more of the blocks of process 900 may be performed in parallel.

Figure 10:
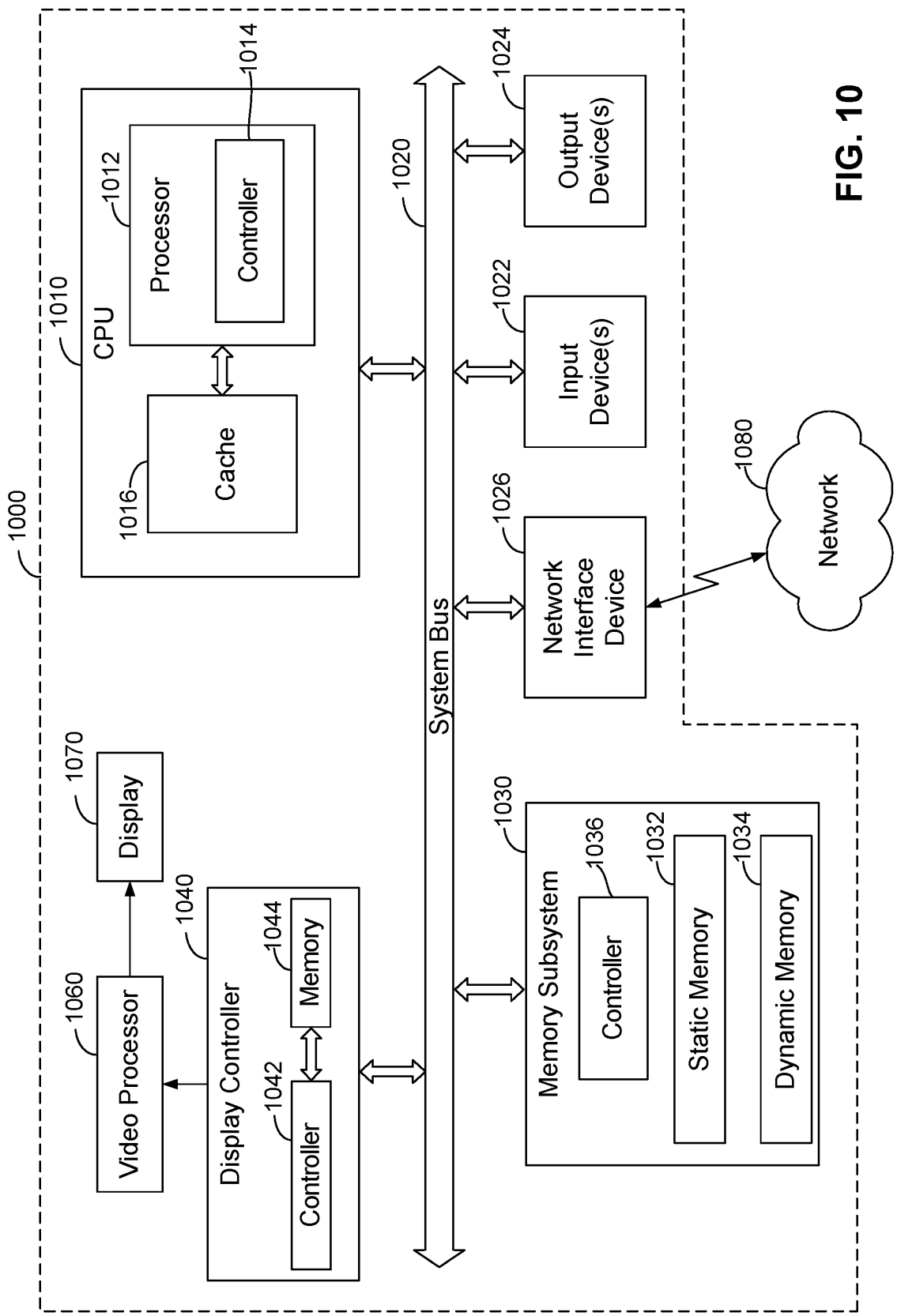
FIG. 10 is a diagram illustrating an example system that may support memory device background operation management for low host battery, in accordance with the present disclosure.

FIG. 10 is a diagram illustrating an example system 1000 that may support memory device background operation management for low host battery, in accordance with the present disclosure. More particularly, as described herein, the memory device background operation management mechanisms and the corresponding methods or processes described herein can be employed in any circuit, including but not limited to a microprocessor-based circuit, system, or others suitable electronic device. For example, electronic devices that can include or otherwise employ the memory device background operation management for low host battery mechanisms described herein can include, without limitation, mobile phones, cellular phones, computers, portable computers, desktop computers, personal digital assistants (PDAs), monitors, computer monitors, televisions, tuners, radios, satellite radios, digital music players, portable music players, digital video players, digital video disc (DVD) players, and/or portable digital video players, among other examples.

For example, in some aspects, FIG. 10 illustrates an example system 1000 that can employ the memory device background operation management mechanisms and corresponding methods and/or processes described in further detail herein. For example, as shown in FIG. 10, the system 1000 may include a CPU 1010 that includes a cache 1016 and a processor 1012, which may include a controller 1014 configured to perform one or more operations described herein in connection with FIGS. 5A, 5B, and 6. Furthermore, although FIG. 10 illustrates that the controller 1014 is included in the processor 1012, the controller 1014 may reside at any suitable location within the system 1000, such as within an integrated circuit that is controlled using command bus training techniques and/or on an external integrated circuit. Additionally, or alternatively, the controller 1014 may be configured to perform one or more processes described herein, such as process 700 of FIG. 7, process 800 of FIG. 8, and/or process 900 of FIG. 9. Additionally, or alternatively, one or more components shown in FIG. 10 may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

For example, in some aspects, the controller 1014 may be configured to detect that the host device 110 has a low battery status using a comparison of a battery level of the host device 110 to a low battery threshold; and/or provide, in association with detecting that the host device 110 has the low battery status, a low battery status indication to a memory device 120 via a status register to cause one or more background operations of the memory device 120 to be deferred or unexecuted while the status register indicates the low battery status indication. Additionally, or alternatively, the controller 1014 may be configured to detect that a host device 110 has a low battery status using a comparison of a battery level of the host device to a low battery threshold; set, in association with detecting that the host device has the low battery status, a low battery status indication of a status register for a memory device 120 to indicate that the host device has the low battery status; and/or cause, in association with the status register indicating the low battery status indication, one or more background operations of the memory device 120 to be deferred or unexecuted.

In some aspects, the CPU 1010 may be coupled to a system bus 1020, which may intercouple various other devices or components included in the system 1000. The CPU 1010 may exchange address, control, and data information over the system bus 1020 to communicate with the other devices or components included in the system 1000. For example, as illustrated in FIG. 10, the devices or components included in the system 1000 can include a memory subsystem 1030 that can include static memory 1032 and/or dynamic memory 1034, one or more input devices 1022, one or more output devices 1024, a network interface device 1026, and a display controller 1040. The memory subsystem 1030 may include a controller 1036. The controller 1036 may be configured to perform one or more operations (e.g., for commands transmitted via the system bus 1020), such as the memory device background operation management for low host battery described herein. The controller 1036 may be configured to perform one or more operations described herein in connection with FIGS. 5 and 6. Furthermore, although FIG. 10 illustrates that the controller 1036 is included in the memory subsystem 1030, the controller 1036 may reside at any suitable location within the system 1000, such as within an integrated circuit that is controlled using command bus training techniques and/or on an external integrated circuit. Additionally, or alternatively, the controller 1036 may be configured to perform one or more processes described herein, such as process 700 of FIG. 7.

For example, in some aspects, the controller 1036 may be configured to obtain, via a status register, a low battery status indication for a host device 110 that indicates that the host device 110 has a low battery level; and/or perform, in association with obtaining the low battery status indication, an action to defer or delay one or more background operations while the status register indicates the low battery status indication.

In various embodiments, the input devices 1022 can include any suitable input device type, such as input keys, switches, voice processors, or the like. The output devices 1024 can similarly include any suitable output device type, such as audio, video, other visual indicators, or the like. The network interface device 1026 can be any device configured to allow exchange of data to and from a network 1080, which may include any suitable network type, including but not limited to a wired or wireless network, private or public network, a local area network (LAN), a wide local area network (WLAN), and the Internet. The network interface device 1026 can support any type of communication protocol desired. The CPU 1010 can access the memory subsystem 1030 over the system bus 1020.

In some aspects, the CPU 1010 can also access the display controller 1040 over the system bus 1020 to control information sent to a display 1070. The display controller 1040 can include a memory controller 1042 and memory 1044 to store data to be sent to the display 1070 in response to communications with the CPU 1010. The display controller 1040 sends information to the display 1070 to be displayed via a video processor 1060, which processes the information to be displayed into a format suitable for the display 1070. The display 1070 can include any suitable display type, including but not limited to a cathode ray tube (CRT), a liquid crystal display (LCD), a plasma display, or the like.

As indicated above, FIG. 10 is provided as an example. Other examples may differ from what is described with respect to FIG. 10.

The following provides an overview of some Aspects of the present disclosure:

Aspect 1: A method performed by a host device, comprising: detecting that the host device has a low battery status using a comparison of a battery level of the host device to a low battery threshold; and providing, in association with detecting that the host device has the low battery status, a low battery status indication to a memory device via a status register to cause one or more background operations of the memory device to be deferred or unexecuted while the status register indicates the low battery status indication.

Aspect 2: The method of Aspect 1, further comprising: detecting, after providing the low battery status indication, that the host device no longer has the low battery status; and providing, to the memory device, an indication that the host device is no longer associated with the low battery status to cause the one or more background operations to be performed.

Aspect 3: The method of Aspect 2, wherein the indication that the host device is no longer associated with the low battery status is included in an interrupt communication.

Aspect 4: The method of any of Aspects 2-3, wherein detecting that the host device no longer has the low battery status comprises: detecting that the battery level is greater than the low battery threshold by an amount that satisfies a threshold.

Aspect 5: The method of any of Aspects 2-4, wherein providing the indication that the host device is no longer associated with the low battery status comprises: setting, via the status register, a parameter associated with the low battery status indication to a value that indicates that the host device is no longer associated with the low battery status.

Aspect 6: The method of any of Aspects 1-5, wherein the one or more background operations include a refresh operation, wherein the memory device is in a selective mode for the refresh operation, and the method further comprises: causing the memory device to switch from the selective mode to a forced mode for the refresh operation.

Aspect 7: The method of Aspect 6, wherein the selective mode is associated with the memory device selectively performing the refresh operation, and wherein the forced mode is associated with the host device controlling the refresh operation.

Aspect 8: The method of any of Aspects 6-7, wherein causing the memory device to switch from the selective mode to the forced mode comprises: providing, to the memory device, an indication that the refresh operation is disabled; and modifying a refresh frequency associated with the refresh operation.

Aspect 9: The method of any of Aspects 1-8, wherein the one or more background operations include a refresh operation, wherein the memory device is in a forced mode for the refresh operation, and the method further comprises: providing, to the memory device, an indication that the refresh operation is disabled.

Aspect 10: The method of any of Aspects 1-9, wherein providing the low battery status indication causes an exception event control indication for urgent background operations to be disabled.

Aspect 11: The method of any of Aspects 1-10, wherein the one or more background operations include at least one of: a refresh operation, a garbage collection operation, a wear leveling operation, or a purge operation.

Aspect 12: A method performed by a memory device, comprising: obtaining, via a status register, a low battery status indication for a host device that indicates that the host device has a low battery level; and performing, in association with obtaining the low battery status indication, an action to defer or delay one or more background operations while the status register indicates the low battery status indication.

Aspect 13: The method of Aspect 12, wherein performing the action comprises: refraining from performing the one or more background operations while the status register indicates the low battery status indication.

Aspect 14: The method of any of Aspects 12-13, wherein performing the action comprises: detecting a background operation, of the one or more background operations, that is to be performed while the status register indicates the low battery status indication; and providing an indication of the background operation to a queue associated with pending operations.

Aspect 15: The method of Aspect 14, further comprising: obtaining an indication that the host device is no longer associated with the low battery level; and performing, in association with the host device no longer being associated with the low battery level, any background operations, including the background operation, included in the queue.

Aspect 16: The method of any of Aspects 12-15, further comprising: obtaining, from the host device, an indication that the host device is no longer associated with the low battery level; and resuming, in association with the host device no longer being associated with the low battery level, the one or more background operations.

Aspect 17: The method of Aspect 16, wherein the indication that the host device is no longer associated with the low battery level is included in an interrupt communication.

Aspect 18: The method of any of Aspects 16-17, wherein obtaining the indication that the host device is no longer associated with the low battery level comprises: detecting, via the status register, that a parameter associated with the low battery status indication is set to a value that indicates that the host device is no longer associated with the low battery level.

Aspect 19: The method of any of Aspects 12-18, wherein the one or more background operations include a refresh operation, wherein the memory device is in a selective mode for the refresh operation, and wherein performing the action comprises: switching from the selective mode to a forced mode for the refresh operation.

Aspect 20: The method of Aspect 19, wherein the selective mode is associated with the memory device selectively performing the refresh operation, and wherein the forced mode is associated with the host device controlling the refresh operation.

Aspect 21: The method of any of Aspects 19-20, wherein performing the action comprises: obtaining, from the host device, an indication that the refresh operation is disabled; and obtaining, from the host device, an indication of a modification of a refresh frequency associated with the refresh operation.

Aspect 22: The method of any of Aspects 12-21, wherein the one or more background operations include a refresh operation, wherein the memory device is in a forced mode for the refresh operation, and wherein performing the action comprises: obtaining, from the host device, an indication that the refresh operation is to be disabled; and disabling the refresh operation.

Aspect 23: The method of any of Aspects 12-22, wherein obtaining the low battery status indication causes an exception event control indication for urgent background operations to be disabled.

Aspect 24: The method of Aspect 23, wherein performing the action comprises: clearing, in association with the status register indicating the low battery status indication, an exception event status indication associated with the exception event control indication for urgent background operations.

Aspect 25: The method of any of Aspects 12-24, wherein the one or more background operations include at least one of: a refresh operation, a garbage collection operation, a wear leveling operation, or a purge operation.

Aspect 26: A method performed by a memory system, comprising: detecting that a host device of the memory system has a low battery status using a comparison of a battery level of the host device to a low battery threshold; setting, in association with detecting that the host device has the low battery status, a low battery status indication of a status register for a memory device of the memory system to indicate that the host device has the low battery status; and causing, in association with the status register indicating the low battery status indication, one or more background operations of the memory device to be deferred or unexecuted.

Aspect 27: The method of Aspect 26, wherein causing the one or more background operations of the memory device to be deferred or unexecuted comprises: refraining from performing the one or more background operations while the status register indicates the low battery status indication.

Aspect 28: The method of any of Aspects 26-27, further comprising: detecting a background operation, of the one or more background operations, that is to be performed by the memory device while the status register indicates the low battery status indication; and providing an indication of the background operation to a queue associated with pending operations for the memory device.

Aspect 29: The method of Aspect 28, further comprising: detecting, after setting the low battery status indication, that the host device of no longer has the low battery status; setting, via the status register, the low battery status indication to a value that indicates that the host device no longer has the low battery status; and performing, via the memory device and in association with the host device no longer having the low battery status, any background operations, including the background operation, included in the queue.

Aspect 30: The method of any of Aspects 26-29, further comprising: detecting, after providing the low battery status indication, that the battery level satisfies the low battery threshold; providing, to the memory device, an indication that the host device is no longer associated with the low battery status; and causing the one or more background operations to be performed by the memory device.

Aspect 31: The method of Aspect 30, wherein the indication that the host device no longer has the low battery status is included in an interrupt communication.

Aspect 32: The method of any of Aspects 30-31, wherein detecting that the host device no longer has the low battery status comprises: detecting that the battery level is greater than the low battery threshold by an amount that satisfies a threshold.

Aspect 33: The method of any of Aspects 30-32, wherein providing the indication that the host device no longer has the low battery status comprises: setting, via the status register, the low battery status indication to a value that indicates that the host device no longer has the low battery status.

Aspect 34: The method of any of Aspects 26-33, wherein the one or more background operations include a refresh operation, wherein the memory device is in a selective mode for the refresh operation, and wherein causing the one or more background operations of the memory device to be deferred or unexecuted comprises: switching the memory device from the selective mode to a forced mode for the refresh operation.

Aspect 35: The method of Aspect 34, wherein the selective mode is associated with the memory device selectively performing the refresh operation, and wherein the forced mode is associated with the host device controlling the refresh operation.

Aspect 36: The method of any of Aspects 34-35, further comprising: providing, from the host device to the memory device, an indication that the refresh operation is disabled; and providing, from the host device to the memory device, an indication of a modification of a refresh frequency associated with the refresh operation.

Aspect 37: The method of any of Aspects 26-36, wherein the one or more background operations include a refresh operation, wherein the memory device is in a forced mode for the refresh operation, and wherein causing the one or more background operations of the memory device to be deferred or unexecuted comprises: providing, to the memory device, an indication that the refresh operation is to be disabled; and disabling the refresh operation for the memory device.

Aspect 38: The method of any of Aspects 26-37, wherein obtaining the low battery status indication causes an exception event control indication for urgent background operations to be disabled.

Aspect 39: The method of Aspect 38, wherein causing the one or more background operations of the memory device to be deferred or unexecuted comprises: clearing, in association with the status register indicating the low battery status indication, an exception event status indication associated with the exception event control indication for urgent background operations.

Aspect 40: The method of any of Aspects 26-39, wherein the one or more background operations include at least one of: a refresh operation, a garbage collection operation, a wear leveling operation, or a purge operation.

Aspect 41: A system configured to perform one or more operations recited in one or more of Aspects 1-40.

Aspect 42: An apparatus comprising means for performing one or more operations recited in one or more of Aspects 1-40.

Aspect 43: A non-transitory computer-readable medium storing a set of instructions, the set of instructions comprising one or more instructions that, when executed by a device, cause the device to perform one or more operations recited in one or more of Aspects 1-40.

Aspect 44: A computer program product comprising instructions or code for executing one or more operations recited in one or more of Aspects 1-40.

Aspect 45: A memory device comprising one or more controllers configured to perform one or more operations recited in one or more of Aspects 1-40.

Aspect 46: A device comprising one or more memories, and one or more processors coupled to the one or more memories, the one or more processors configured to perform one or more operations recited in one or more of Aspects 1-40.

Aspect 47: A device comprising one or more memories, and one or more processors coupled to the one or more memories, the one or more processors configured to cause the device to perform one or more operations recited in one or more of Aspects 1-40.

Aspect 48: A system comprising one or more controllers configured to cause the device to perform one or more operations recited in one or more of Aspects 1-40.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A host device, comprising:
   one or more memories; and
   one or more processors, coupled to the one or more memories, configured to:
   detect that the host device has a low battery status using a comparison of a battery level of the host device to a low battery threshold; and
   provide, in association with detecting that the host device has the low battery status, a low battery status indication to a memory device via a status register to cause one or more background operations of the memory device to be deferred or unexecuted while the status register indicates the low battery status indication, wherein a first value of a bit of the status register indicates to the memory device that the low battery status is not present, and a second value of the bit of the status register indicates to the memory device that the low battery status is present and is used to cause the one or more background operations of the memory device to be deferred or unexecuted.

2. The host device of claim 1,
   wherein the one or more processors are further conlfigured to:

detect, after providing the low battery status indication, that the host device no longer has the low battery status; and provide, to the memory device, an indication that the host device is no longer associated with the low battery status to cause the one or more background operations to be performed.

3. The host device of claim 2, wherein the indication that the host device is no longer associated with the low battery status is included in an interrupt communication.

4. The host device of claim 2, wherein the one or more processors, to detect that the host device no longer has the low battery status, are configured to:

detect that the battery level is greater than the low battery threshold by an amount that satisfies a threshold.

5. The host device of claim 2, wherein the one or more processors, to provide the indication that the host device is no longer associated with the low battery status, are configured to:

set, via the status register, a parameter associated with the low battery status indication to a value that indicates that the host device is no longer associated with the low battery status.

6. A memory device, comprising:
one or more memories; and
one or more processors, coupled to the one or more memories, configured to:

obtain, via a status register, a low battery status indication for a host device that indicates that the host device has a low battery level, wherein a first value of a bit of the status register indicates that the low battery level is not present, and a second value of the bit of the status register indicates that the low battery level is present; and perform, in association with obtaining the low battery status indication, an action to defer or delay one or more background operations while the status register indicates the low battery status indication.

7. The memory device of claim 6, wherein the one or more processors, to perform the action, are configured to:

refrain from performing the one or more background operations while the status register indicates the low battery status indication.

8. The memory device of claim 6, wherein the one or more processors, to perform the action, are configured to:

detect a background operation, of the one or more background operations, that is to be performed while the status register indicates the low battery status indication; and provide an indication of the background operation to a queue associated with pending operations.

9. The memory device of claim 8, wherein the one or more processors are further configured to:

obtain an indication that the host device is no longer associated with the low battery level; and perform, in association with the host device no longer being associated with the low battery level, any background operations, including the background operation, included in the queue.

10. The memory device of claim 6, wherein the one or more processors are further configured to:

obtain, from the host device, an indication that the host device is no longer associated with the low battery level; and resume, in association with the host device no longer being associated with the low battery level, the one or more background operations.

11. The memory device of claim 6, wherein the one or more background operations include a refresh operation, wherein the memory device is in a selective mode for the refresh operation, and wherein performing the action comprises:

switch from the selective mode to a forced mode for the refresh operation.

12. The memory device of claim 6, wherein the one or more background operations include a refresh operation, wherein the memory device is in a forced mode for the refresh operation, and wherein the one or more processors, to perform the action, are configured to:

obtain, from the host device, an indication that the refresh operation is to be disabled; and disable the refresh operation.

13. The memory device of claim 6, wherein obtaining the low battery status indication causes an exception event control indication for urgent background operations to be disabled.

14. The memory device of claim 13, wherein the one or more processors, to perform the action, are configured to:

clear, in association with the status register indicating the low battery status indication, an exception event status indication associated with the exception event control indication for urgent background operations.

15. A method performed by a host device, comprising:
detecting that the host device has a low battery status using a comparison of a battery level of the host device to a low battery threshold; and providing, in association with detecting that the host device has the low battery status, a low battery status indication to a memory device via a status register to cause one or more background operations of the memory device to be deferred or unexecuted while the status register indicates the low battery status indication, wherein a first value of a bit of the status register indicates to the memory device that the low battery status is not present, and a second value of the bit of the status register indicates to the memory device that the low battery status is present and is used to cause the one or more background operations of the memory device to be deferred or unexecuted.

16. The method of claim 15, wherein the one or more background operations include a refresh operation, wherein the memory device is in a selective mode for the refresh operation, and the method further comprises:

causing the memory device to switch from the selective mode to a forced mode for the refresh operation.

17. The method of claim 16, wherein the selective mode is associated with the memory device selectively performing the refresh operation, and wherein the forced mode is associated with the host device controlling the refresh operation.

18. The method of claim 16, wherein causing the memory device to switch from the selective mode to the forced mode comprises:

providing, to the memory device, an indication that the refresh operation is disabled; and modifying a refresh frequency associated with the refresh operation.

19. The method of claim 15, wherein the one or more background operations include a refresh operation, wherein the memory device is in a forced mode for the refresh operation, and the method further comprises:

providing, to the memory device, an indication that the refresh operation is disabled.

20. The method of claim 15, wherein providing the low battery status indication causes an exception event control indication for urgent background operations to be disabled.

* * * * *